US012581407B2

(12) United States Patent
Hu et al.

(10) Patent No.: US 12,581,407 B2
(45) Date of Patent: Mar. 17, 2026

(54) SYSTEMS AND METHODS OF RESTRICTED TWT FOR WIRELESS COMMUNICATION

(71) Applicant: Meta Platforms Technologies, LLC, Menlo Park, CA (US)

(72) Inventors: Chunyu Hu, Saratoga, CA (US); Chittabrata Ghosh, Fremont, CA (US); Binita Gupta, San Diego, CA (US); Muhammad Kumail Haider, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 573 days.

(21) Appl. No.: 17/950,031

(22) Filed: Sep. 21, 2022

(65) Prior Publication Data

US 2023/0130117 A1     Apr. 27, 2023

Related U.S. Application Data

(60) Provisional application No. 63/298,805, filed on Jan. 12, 2022, provisional application No. 63/270,316, filed on Oct. 21, 2021.

(51) Int. Cl.
*H04W 52/02*     (2009.01)
*H04W 74/0816*     (2024.01)
*H04W 84/12*     (2009.01)

(52) U.S. Cl.
CPC ... *H04W 52/0216* (2013.01); *H04W 74/0816* (2013.01); *H04W 84/12* (2013.01)

(58) Field of Classification Search
CPC ......... H04W 52/0216; H04W 74/0816; H04W 84/12; H04W 52/0229
See application file for complete search history.

(56) References Cited

U.S. PATENT DOCUMENTS

2021/0329500 A1* 10/2021 Cariou ................ H04W 74/002

FOREIGN PATENT DOCUMENTS

WO        2022203344 A1     9/2022

OTHER PUBLICATIONS

"Extremely High Throughput (EHT) MAC Specification," IEEE Draft [online], [Retrieved on Sep. 23, 2021], 96 pages, vol. 802.11, No. D1.2, Retrieved from the Internet: URL: https://grouper.ieee.org/groups/802/11/private/Draft_Standards/11be/Draft%20P802.11be_1.2%20-%20Word.zip TGbe_Cl_35.doc.
Hu C., et al., "CC36-CR-35.6 Restricted TWT Announcement," IEEE Draft, Aug. 12, 2021, vol. 802.11 EHT; 802.11be, No. 1, pp. 1-7, Retrieved from the Internet: URL: https://mentor.ieee.org/802.11/dcn/21/11-21-1147-01-00be-cc36-cr-35-6-restricted-twt-announcement.docx, [Retrieved on Aug. 12, 2021].

(Continued)

*Primary Examiner* — Mohammad S Anwar
(74) *Attorney, Agent, or Firm* — Foley & Lardner LLP

(57) ABSTRACT
A device may include one or more processors. The one or more processors may be configured to determine a capabilities code indicating at least one of a plurality of defined capabilities of the device relating to restricted target wake time (rTWT) operations in a wireless local area network (WLAN). The one or more processors may be configured to wirelessly transmit, via a transmitter, a first frame including the capabilities code.

4 Claims, 16 Drawing Sheets

1400

Determining a capabilities code indicating at least one of a plurality of defined capabilities of the device relating to restricted target wake time (rTWT) operations in a wireless local area network (WLAN) 1402

Wirelessly transmitting, via a transmitter, a first frame including the capabilities code 1404

(56) References Cited

OTHER PUBLICATIONS

International Search Report and Written Opinion for International Application No. PCT/US2022/047400, mailed Feb. 7, 2023, 13 pages.
Hu C., et al., "PDT-MAC-Proposed Spec Text Restricted-TWT," IEEE Draft: IEEE 802. 11-21/142r9, Facebook Inc, Jan. 2021, 4 Pages, Retrieved from the Internet URL: https://mentor.IEEE.org/802.11/dcn/21/11-21-0142-09-00be-pdt-mac-restricted-twt.docx.
Hu C., et al., "PDT-MAC-Restricted-TWT-TBDs-CRs-Part1," IEEE Draft; IEEE 802.11-21/0462r9, Facebook Inc, Mar. 2021, 7 Pages, Retrieved from the Internet URL: https://mentor.IEEE.org/802.11/dcn/21/11-21-0462-09-00be-pdt-mac-restricted-twt-tbds-crs-part1.docx.
Office Action mailed Oct. 14, 2025 for Taiwan Application No. 111138400, filed Oct. 11, 2022, 9 pages.

\* cited by examiner

1400

Determining a capabilities code indicating at least one of a plurality of defined capabilities of the device relating to restricted target wake time (rTWT) operations in a wireless local area network (WLAN)    1402

Wirelessly transmitting, via a transmitter, a first frame including the capabilities code 1404

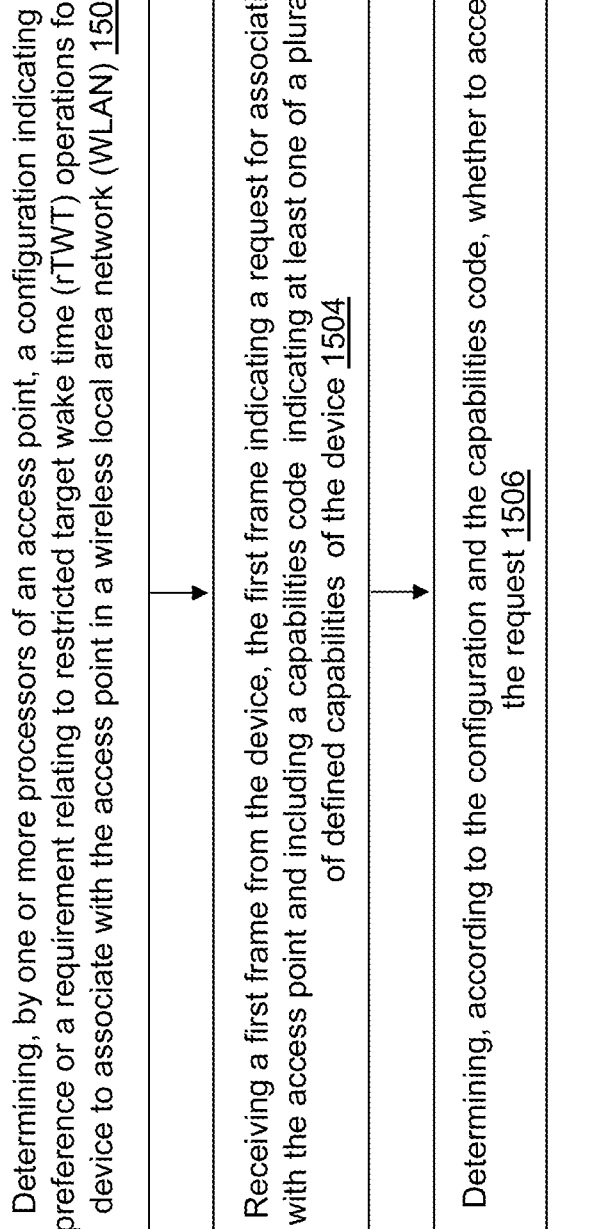

1500

Determining, by one or more processors of an access point, a configuration indicating a preference or a requirement relating to restricted target wake time (rTWT) operations for a device to associate with the access point in a wireless local area network (WLAN) 1502

Receiving a first frame from the device, the first frame indicating a request for association with the access point and including a capabilities code indicating at least one of a plurality of defined capabilities of the device 1504

Determining, according to the configuration and the capabilities code, whether to accept the request 1506

FIG. 15

SYSTEMS AND METHODS OF RESTRICTED TWT FOR WIRELESS COMMUNICATION

CROSS-REFERENCE TO RELATED APPLICATION

This application claims priority to U.S. Provisional Patent Application No. 63/270,316 filed on Oct. 21, 2021, which is incorporated by reference herein in its entirety for all purposes. This application also claims priority to U.S. Provisional Patent Application No. 63/298,805 filed on Jan. 12, 2022, which is incorporated by reference herein in its entirety for all purposes.

FIELD OF DISCLOSURE

The present disclosure is generally related to communications, including but not limited to systems and methods of protecting restricted target wake time (rTWT) operation for wireless communication using rTWT operation/support capabilities and operation requirements.

BACKGROUND

Artificial reality, such as a VR, AR, or MR, provides immersive experience to a user. In one example, a user wearing a head wearable display (HWD) can turn his head to one side, and an image of a virtual object corresponding to a location and/or an orientation of the HWD and a gaze direction of the user can be displayed on the HWD to allow the user to feel as if the user is moving within a space of an artificial reality (e.g., a VR space, an AR space, or a MR space).

In one implementation, an image of a virtual object is generated by a remote computing device communicatively coupled to the HWD, and the image is rendered by the HWD to conserve computational resources and/or achieve bandwidth efficiency. In one example, the HWD includes various sensors that detect a location and/or orientation of the HWD and a gaze direction of the user wearing the HWD, and transmits sensor measurements indicating the detected location and gaze direction to a console device (and/or a remote server, e.g., in the cloud) through a wired connection or a wireless connection. The console device can determine a user's view of the space of the artificial reality according to the sensor measurements, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a device including one or more processors. In some embodiments, the one or more processors may be configured to determine a capabilities code indicating at least one of a plurality of defined capabilities of the device relating to restricted target wake time (rTWT) operations in a wireless local area network (WLAN). The one or more processors may be configured to wirelessly transmit, via a transmitter, a first frame including the capabilities code.

In some embodiments, the first frame may be a management frame including an information element (IE). The capabilities code may be included in the IE of the management frame. In some embodiments, the plurality of defined capabilities may include a capability to perform the rTWT operations. The rTWT operations may include at least one of setting up a rTWT schedule or establishing a membership of a rTWT schedule.

In some embodiments, the plurality of defined capabilities may include a capability to complete or terminate a transmission by a start time of a rTWT service period (SP) assigned to another device. The one or more processors may be configured to obtain a transmit opportunity (TXOP) before the start time such that a duration of the TXOP ends before the start time.

Various embodiments disclosed herein are related to an access point including one or more processors. In some embodiments, the one or more processors may be configured to determine a configuration indicating a preference or requirement relating to restricted target wake time (rTWT) operations for a device to associate with the access point in a wireless local area network (WLAN). The one or more processors may be configured to receive a first frame from the device, the first frame indicating a request for association with the access point and including a capabilities code indicating at least one of a plurality of defined capabilities of the device. The one or more processors may be configured to determine, according to the configuration and the capabilities code, whether to accept the request.

In some embodiments, the one or more processors may be configured to determine whether the capabilities code indicates one or more capabilities relating to the rTWT operations. In response to the capabilities code not indicating one or more capabilities relating to the rTWT operations, the one or more processors may be configured to reject the request.

In some embodiments, the capabilities code may indicate at least one of (1) a capability that does not relate to the rTWT operations, (2) a first rTWT capability to complete or terminate a transmission by a start time of a rTWT service period (SP) assigned to another device, or (3) a second rTWT capability to perform the rTWT operations. The configuration may indicate one of (1) a preference that the device supports the first rTWT capability, (2) a requirement that the device supports the first rTWT capability, or (3) a requirement that the device supports the second rTWT capability. In response to (1) the configuration indicating the preference for the first rTWT capability and (2) the capabilities code neither indicating the first rTWT capability nor the second rTWT capability, the one or more processors may be configured to determine, according to one or more conditions of the access point, whether the request is accepted, the one or more conditions including at least one of a traffic condition, a load condition, or a channel condition. In some embodiments, in response to (1) the configuration indicating the requirement of the first capability and (2) the capabilities code indicating the first capability, the one or more processors may be configured to determine to accept the request, and transmit, to the device, a response frame in response to the first frame.

Various embodiments disclosed herein are related to a method including determining, by one or more processors of an access point, a configuration indicating a preference or a requirement relating to restricted target wake time (rTWT) operations for a device to associate with the access point in a wireless local area network (WLAN). The method may include receiving a first frame from the device, the first frame indicating a request for association with the access point and including a capabilities code indicating at least one of a plurality of defined capabilities of the device. The method may include determining, according to the configuration and the capabilities code, whether to accept the request.

In some embodiments, the one or more processors of the access point may determine whether the capabilities code indicates one or more capabilities relating to the rTWT operations. In response to the capabilities code not indicating one or more capabilities relating to the rTWT operations, the one or more processors may determine to reject the request.

In some embodiments, the capabilities code indicates at least one of (1) a capability that does not relate to the rTWT operations, (2) a first rTWT capability to complete or terminate a transmission by a start time of a rTWT service period (SP) assigned to another device, or (3) a second rTWT capability to perform the rTWT operations. The configuration may indicate one of (1) a preference that the device supports the first rTWT capability, (2) a requirement that the device supports the first rTWT capability, or (3) a requirement that the device supports the second rTWT capability.

In some embodiments, in response to (1) the configuration indicating the preference for the first rTWT capability and (2) the capabilities code neither indicating the first rTWT capability nor the second rTWT capability, the one or more processors may determine, according to one or more conditions of the access point, whether the request is accepted, the one or more conditions including at least one of a traffic condition, a load condition, or a channel condition.

In some embodiments, in response to (1) the configuration indicating the requirement of the first capability and (2) the capabilities code indicating the first capability, the one or more processors may determine to accept the request, and transmit, to the device, a response frame in response to the first frame.

In some embodiments, in response to (1) the configuration indicating the requirement of the second capability and (2) the capabilities code indicating the second capability, the one or more processors may determine to accept the request, and transmit, to the device, a response frame in response to the first frame.

In some embodiments, the one or more processors may determine whether the device is associated with the access point. In response to determining that the device is associated with the access point, the one or more processors may determine, according to the configuration and the capabilities code, whether the device is to be disassociated from the access point.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 15 is a flowchart showing a process of protecting restricted target wake time operation for wireless communication, according to an example implementation of the present disclosure.

DETAILED DESCRIPTION

Figure 1:
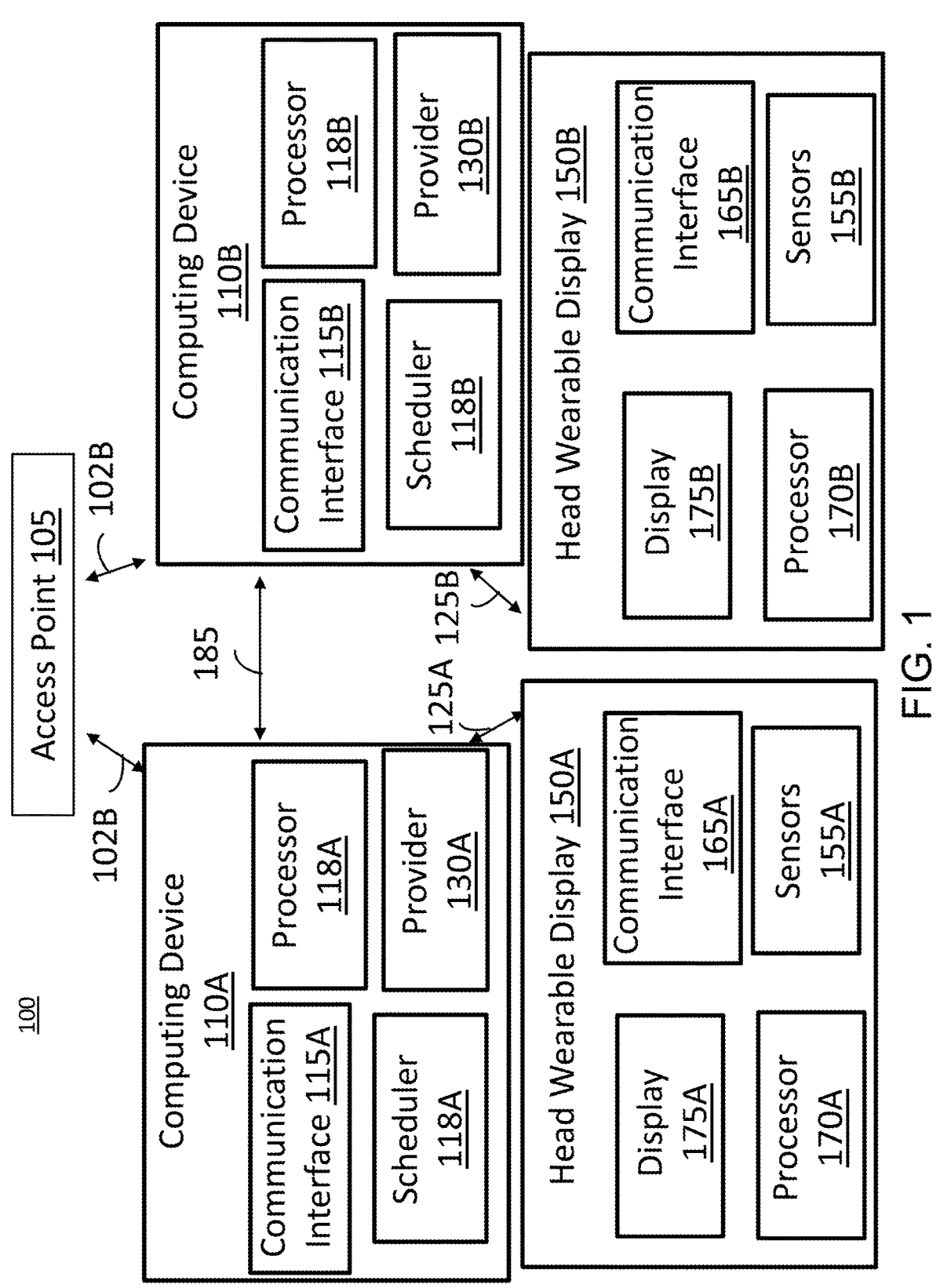
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to protecting restricted target wake time (rTWT) operation for wireless communication using rTWT operation/support capabilities and operation requirements. In some embodiments, a device (e.g., a computing device, a HWD, a non-AP station (STA), a STA of a STA multi-link device (MLD)) may include one or more processors. The one or more processors may determine a capabilities code indicating at least one of a plurality of defined capabilities of the device relating to rTWT operations (e.g., capabilities of rTWT operation support and/or protecting a start time of rTWT service period (SP)) in a wireless local area network (WLAN). The one or more processors may wirelessly transmit, via a transmitter, a first frame including the capabilities code (e.g., including the capabilities code in an extreme high throughput (EHT) capability field).

In some embodiments, an access point (e.g., an AP, a soft AP, an AP of an AP MLD) may include one or more processors. The one or more processors may determine a configuration indicating a preference or requirement relating to rTWT operations (e.g., preference or requirement of capabilities of rTWT operation support and/or protecting a start time of rTWT SP) for a device (e.g., a computing device, a HWD, a non-AP STA, a STA of a STA MLD) to associate with the access point in a WLAN. The one or more processors may receive a first frame from the device, the first frame indicating a request for association with the access point and including a capabilities code indicating at least one of a plurality of defined capabilities of the device (e.g., including the capabilities code in an EHT capability field). The one or more processors may determine, according to the configuration and the capabilities code, whether to accept the request.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

TWT can be a time agreed/negotiated upon by devices (e.g., access points (APs) and/or stations (STAs)), or specified/configured by one device (e.g., an AP). During the wake time, a first device (e.g., a STA) may be in an awake state (e.g., its wireless communication module/interface is in a fully powered-up ready, or wake state) and is able to transmit and/or receive. When the first device is not awake (e.g., its wireless communication module/interface is in a powered-down, low power, or sleep state), the first device may enter a low power mode or other sleep mode. The first device may exist in the sleep state until a time instance/window as specified by the TWT.

TWT is a mechanism where a set of service periods (SPs) are defined and shared between devices to reduce medium contention and improve the power efficiency of the devices. For example, the first device can wake up periodically (e.g., at a fixed, configured time interval/period/cycle) based on the TWT. The TWT reduces energy consumption of the devices by limiting the awake time and associated power consumption of the devices.

An AP (e.g., AP and/or other device operating as a soft AP/hotspot) may enhance medium access protection and resource reservation by supporting restricted TWT (rTWT). The rTWT SPs may be used to deliver latency sensitive traffic and/or any additional frame that supports latency sensitive traffic. Example implementations and operations of rTWT are provided in U.S. patent application Ser. No.

17/490,985, filed on Sep. 30, 2021, entitled "SYSTEMS AND METHOD OF TARGET WAKE TIME FOR PEER-TO-PEER COMMUNICATION", which is incorporated herein by reference in its entirety.

FIG. 1 is a block diagram of an example artificial reality system environment. FIG. 1 provides an example environment in which devices may communicate traffic streams with different latency sensitivities/requirements. In some embodiments, the artificial reality system environment 100 includes an access point (AP) 105, one or more head wearable displays (HWD) 150 (e.g., HWD 150A, 150B) worn by a user, and one or more computing devices 110 (computing devices 110A, 110B) providing content of artificial reality to the HWDs 150.

The access point 105 may be a router or any network device allowing one or more computing devices 110 and/or one or more HWDs 150 to access a network (e.g., the Internet). The access point 105 may be replaced by any communication device (cell site). A HWD may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the computing device 110 through a wired or wireless connection. The HWD 150 may also identify objects (e.g., body, hand face).

In some embodiments, the computing devices 110A, 110B communicate with the access point 105 through communication links 102A, 102B (e.g., interlinks), respectively. In some embodiments, the computing device 110A may communicate with the HWD 150A through a communication link 125A (e.g., intralink), and the computing device 110B may communicate with the HWD 150B through a wireless link 125B (e.g., intralink).

The computing device 110 may be a computing device or a mobile device that can retrieve content from the access point 105, and can provide image data of artificial reality to a corresponding HWD 150. Each HWD 150 may present the image of the artificial reality to a user according to the image data.

The computing device 110 may determine a view within the space of the artificial reality corresponding to the detected location, orientation and/or the gaze direction, and generate an image depicting the determined view detected by the HWD 150s. The computing device 110 may also receive one or more user inputs and modify the image according to the user inputs. The computing device 110 may provide the image to the HWD 150 for rendering. The image of the space of the artificial reality corresponding to the user's view can be presented to the user.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the computing device 110 may be performed by the HWD 150, and/or some of the functionality of the HWD 150 may be performed by the computing device 110. In some embodiments, the computing device 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155 (e.g., sensors 155A, 155B) including eye trackers and hand trackers for instance, a communication interface 165 (e.g., communication interface 165A, 165B), an electronic display 175, and a processor 170 (e.g., processor 170A, 170B). These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, hand trackers, eye trackers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 may also include eye trackers with electronic components or a combination of electronic components and software components that determine a gaze direction of the user of the HWD 150. In other embodiments, the eye trackers may be a component separate from sensors 155. In some embodiments, the HWD 150, the computing device 110 or a combination may incorporate the gaze direction of the user of the HWD 150 to generate image data for artificial reality. In some embodiments, the eye trackers (as part of the sensors 155, for instance) include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers as part of the sensors 155. In some embodiments, a user of the HWD 150 is prompted to enable or disable the eye trackers as part of the sensor 155 configuration.

In some embodiments, the sensors 155 include the hand tracker, which includes an electronic component or a combination of an electronic component and a software component that tracks a hand of the user. In other embodiments, the hand tracker may be a component separate from sensors 155. In some embodiments, the hand tracker includes or is coupled to an imaging sensor (e.g., camera) and an image processor that can detect a shape, a location and/or an orientation of the hand. The hand tracker may generate hand tracking measurements indicating the detected shape, location and/or orientation of the hand.

In some embodiments, the communication interfaces 165 (e.g., communication interface 165A, 165B) of the corresponding HWDs 150 (e.g., HWD 150A, 150B) and/or communication interfaces 115 (e.g., communication interface 115A, 115B) of the corresponding computing devices (e.g., computing device 110A, 110B) include an electronic component or a combination of an electronic component and a software component that is used for communication.

The communication interface 165 may communicate with a communication interface 115 of the computing device 110 through an intralink communication link 125 (e.g., communication link 125A, 125B). The communication interface 165 may transmit to the computing device 110 sensor measurements indicating the determined location of the HWD 150, orientation of the HWD 150, the determined gaze direction of the user, and/or hand tracking measurements. For example, the computing device 110 may receive sensor measurements indicating location and the gaze direction of the user of the HWD 150 and/or hand tracking measurements and provide the image data to the HWD 150 for presentation of the artificial reality, for example, through the wireless link 125 (e.g., intralink). For example, the communication interface 115 may transmit to the HWD 150 data describing an image to be rendered. The communication interface 165 may receive from the computing device 110 sensor measurements indicating or corresponding to an image to be rendered. In some embodiments, the HWD 150 may communicate with the access point 105.

Similarly, the communication interface 115 (e.g., communication interface 115A, 115B) of the computing devices 110 may communicate with the access point 105 through a communication link 102 (e.g., communication link 102A, 102B). In certain embodiments, the computing device 110 may be considered a soft access point (e.g., a hotspot device). Through the communication link 102 (e.g., inter-link), the communication interface 115 may transmit and receive from the access point 105 AR/VR content. The communication interface 115 of the computing device 110 may also communicate with communication interface 115 of a different computing device 110 through communication link 185. As described herein, the communication interface 115 may be a counterpart component to the communication interface 165 to communicate with a communication interface 115 of the computing device 110 through a communication link (e.g., USB cable, a wireless link).

The communication interfaces 115 and 165 may receive and/or transmit information indicating a communication link (e.g., channel, timing) between the devices (e.g., between the computing devices 110A and 110B across communication link 185, between the HWD 150A and computing device 110A across communication link 125). According to the information indicating the communication link, the devices may coordinate or schedule operations to avoid interference or collisions.

The communication link may be a wireless link, a wired link, or both. In some embodiments, the communication interface 165/115 includes or is embodied as a transceiver for transmitting and receiving data through a wireless link. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the computing device 110 and the head wearable display 150 are implemented on a single system, the communication interface 165 may communicate with the computing device 110 through a bus connection or a conductive trace.

Using the communication interface, the computing device 110 (or HWD 150, or AP 105) may coordinate operations on links 102, 185 or 125 to reduce collisions or interferences by scheduling communication. For example, the computing device 110 may coordinate communication between the computing device 110 and the HWD 150 using communication link 125. Data (e.g., a traffic stream) may flow in a direction on link 125. For example, the computing device 110 may communicate using a downlink (DL) communication to the HWD 150 and the HWD 150 may communicate using an uplink (UL) communication to the computing device 110. In some implementations, the computing device 110 may transmit a beacon frame periodically to announce/advertise a presence of a wireless link between the computing device 110 and the HWD 150 (or between HWDs 150A and 150B). In an implementation, the HWD 150 may monitor for or receive the beacon frame from the computing device 110, and can schedule communication with the HWD 150 (e.g., using the information in the beacon frame, such as an offset value) to avoid collision or interference with communication between the computing device 110 and/or HWD 150 and other devices.

In some embodiments, the processor 170 may include an image renderer, for instance, which includes an electronic component or a combination of an electronic component and a software component that generates one or more images for display, for example, according to a change in view of the space of the artificial reality. In some embodiments, the image renderer is implemented as processor 170 (or a graphical processing unit (GPU), one or more central processing unit (CPUs), or a combination of them) that executes instructions to perform various functions described herein. In other embodiments, the image renderer may be a component separate from processor 170. The image renderer may receive, through the communication interface 165, data describing an image to be rendered, and render the image through the electronic display 175. In some embodiments, the data from the computing device 110 may be encoded, and the image renderer may decode the data to generate and render the image. In one aspect, the image renderer receives the encoded image from the computing device 110, and decodes the encoded image, such that a communication bandwidth between the computing device 110 and the HWD 150 can be reduced.

In some embodiments, the image renderer receives, from the computing device, 110 additional data including object information indicating virtual objects in the artificial reality space and depth information indicating depth (or distances from the HWD 150) of the virtual objects. Accordingly, the image renderer may receive from the computing device 110 object information and/or depth information. The image renderer may also receive updated sensor measurements from the sensors 155. The process of detecting, by the HWD 150, the location and the orientation of the HWD 150 and/or the gaze direction of the user wearing the HWD 150, and generating and transmitting, by the computing device 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer may generate a small portion (e.g., 10%) of an image corresponding to an updated view within the artificial reality according to the updated sensor measurements, and append the portion to the image in the image data from the computing device 110 through reprojection. The image renderer may perform shading and/or blending on the appended edges. Hence, without recreating the image of the artificial reality according to the updated sensor measurements, the image renderer can generate the image of the artificial reality.

In other implementations, the image renderer generates one or more images through a shading process and a reprojection process when an image from the computing device 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the processor 170 (e.g., image renderer).

In some embodiments, the HWD 150 may include a lens to allow the user to see the display 175 in a close proximity. The lens may be a mechanical component that alters received light from the electronic display 175. The lens may magnify the light from the electronic display 175, and correct for optical error associated with the light. The lens may be a Fresnel lens, a convex lens, a concave lens, a filter, or any suitable optical component that alters the light from the electronic display 175. Through the lens, light from the electronic display 175 can reach the pupils, such that the user can see the image displayed by the electronic display 175, despite the close proximity of the electronic display 175 to the eyes.

In some embodiments, the processor 170 performs compensation to compensate for any distortions or aberrations. In some embodiments, a compensator may be a device separate from the processor 170. The compensator includes an electronic component or a combination of an electronic component and a software component that performs compensation. In one aspect, the lens introduces optical aberrations such as a chromatic aberration, a pin-cushion distortion, barrel distortion, etc. The compensator may determine a compensation (e.g., predistortion) to apply to the image to be rendered from the image renderer to compensate for the distortions caused by the lens, and apply the determined compensation to the image from the image renderer. The compensator may provide the predistorted image to the electronic display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a communication interface 115, a processor 118, and a content provider 130 (e.g., content provider 130A, 130B). These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view.

The processors 118, 170 includes or is embodied as one or more central processing units, graphics processing units, image processors, or any processors for generating images of the artificial reality. In some embodiments, the processors 118, 170 may configure or cause the communication interfaces 115, 165 to toggle, transition, cycle or switch between a sleep mode and a wake up mode. In the wake up mode, the processor 118 may enable the communication interface 115 and the processor 170 may enable the communication interface 165, such that the communication interfaces 115, 165 may exchange data. In the sleep mode, the processor 118 may disable the wireless interface 115 and the processor 170 may disable (e.g., may implement low power or reduced operation in) the communication interface 165, such that the communication interfaces 115, 165 may not consume power, or may reduce power consumption.

The processors 118, 170 may schedule the communication interfaces 115, 165 to switch between the sleep mode and the wake up mode periodically every frame time (e.g., 11 ms or 16 ms). For example, the communication interfaces 115, 165 may operate in the wake up mode for 2 ms of the frame time, and the communication interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the communication interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the communication interfaces 115, 165 to enter a subsequent wake up mode according to timing of the previous communication indicated by the stored information. For example, the communication interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the communication interfaces 115, 165 to resume communication via the channel or frequency band of the previous communication indicated by the stored information. Accordingly, the communication interfaces 115, in 165 entering the wake up mode from the sleep mode may resume communication, while bypassing a scan procedure to search for available channels and/or performing handshake or authentication. Bypassing the scan procedure allows extension of a duration of the communication interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space. The content provider 130 may encode the image data describing the image, and can transmit the encoded data to the HWD 150. In some embodiments, the content provider generates and provides the image data to the HWD 150 periodically (e.g., every 11 ms or 16 ms).

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

In some embodiments, a scheduler 118 (e.g., scheduler 118A of the computing device 118A and/or scheduler 118B of the computing device 110B) may request rTWT to transmit latency sensitive traffic using P2P communication. The AP 105 and scheduler 118 of the computing devices 110 may negotiate (e.g., perform a handshake process) and may establish a membership of a restricted TWT schedule. In some embodiments, when the AP 105 and the scheduler 118 are negotiating, the AP 105 may be considered a restricted TWT scheduling AP and the computing devices 110 may be considered a restricted TWT scheduled STA.

In some embodiments, the HWD 150 may request to send P2P traffic to the computing device 110. Accordingly, the HWD 150 may be considered the TWT requesting STA (e.g., the TWT STA that requests the TWT agreement), and the computing device 110 may be considered TWT responding STA (e.g., the TWT STA that respond to the TWT request). The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105. In other embodiments, the computing device 110 may request to send P2P traffic to the HWD 150 such that the computing device 110 is considered the TWT requesting STA and the HWD 150 is the TWT responding STA.

The schedulers 118 of the computing devices 110 may schedule communication between the computing device(s) 110 and the HWD(s) 150 with the AP 105 such that the communication between the computing device(s) 110 and HWD(s) 150 is protected. The computing device(s) 110 may initiate such protected P2P communication with the HWD(s) 150 by indicating, to the AP 105, that the computing device(s) 110 wish to schedule P2P communication in rTWT service periods (SPs). The scheduler 118 of the computing device(s) may schedule (or negotiate) the requested rTWT SP(s). The scheduler 118 of the computing device(s) may also indicate if the SP(s) are requested only for P2P communication (as compared to mixed P2P communication and non-P2P communication).

Figure 2:
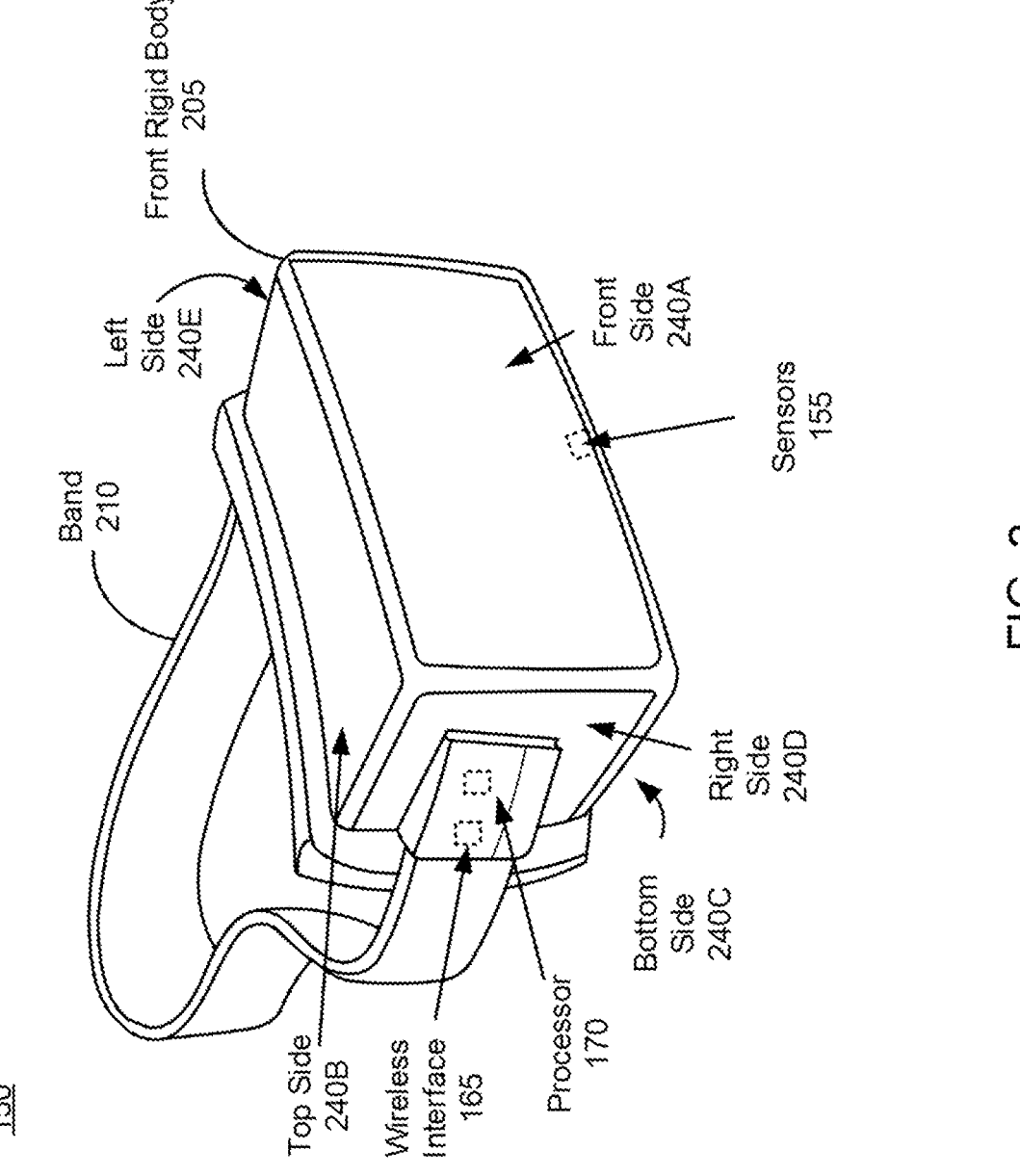
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens (not shown in FIG. 2), the sensors 155, the eye trackers the communication interface 165, and the processor 170. In the embodiment shown by FIG. 2, the sensors 155 are located within the front rigid body 205, and may not visible to the user. In other embodiments, the HWD 150 has a different configuration than shown in FIG. 2. For example, the processor 170, the eye trackers, and/or the sensors 155 may be in different locations than shown in FIG. 2.

Figure 3:
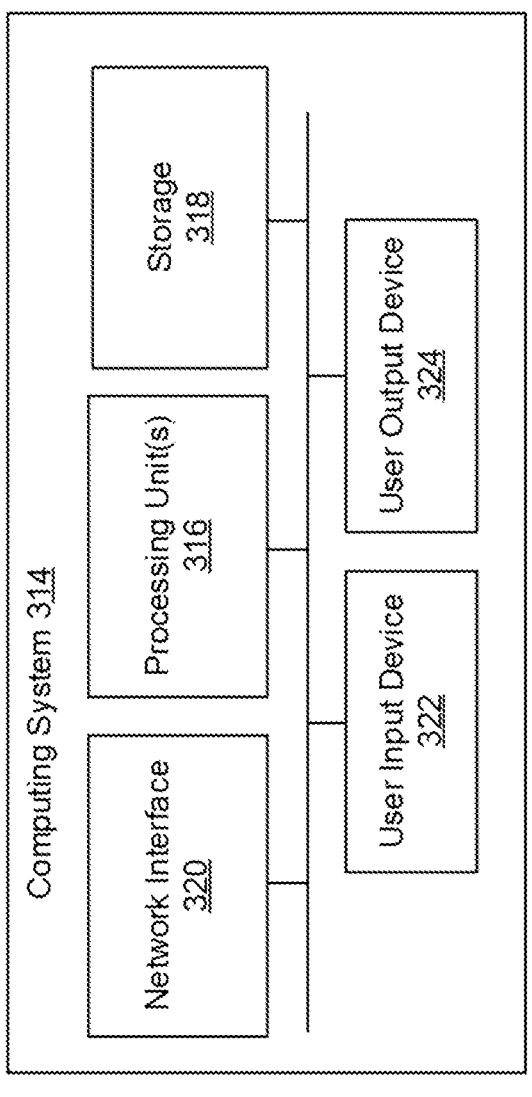
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the computing device 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
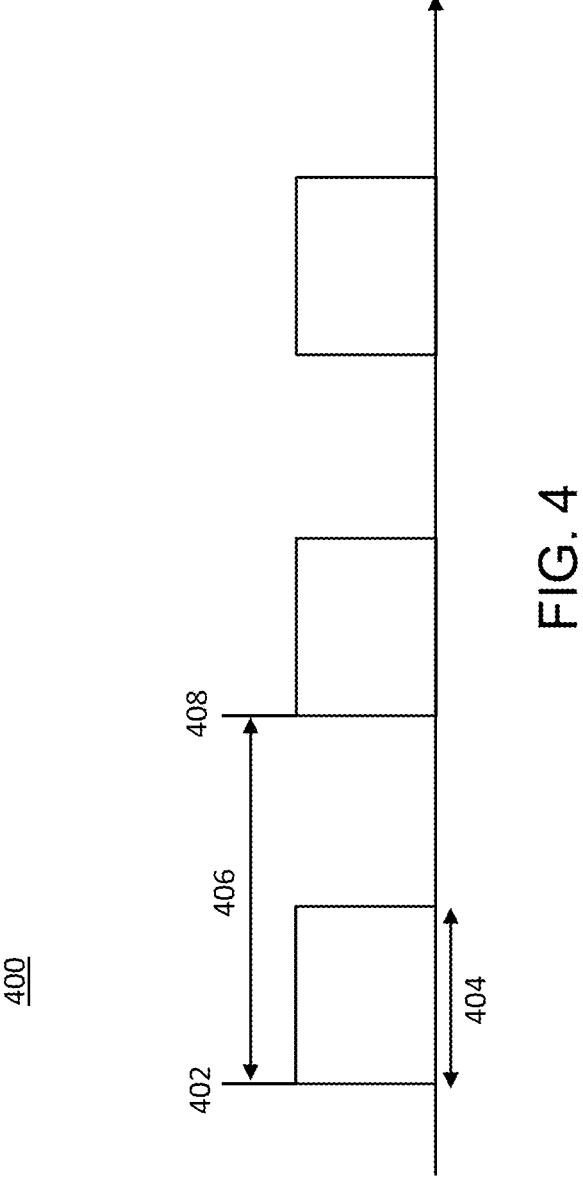
FIG. 4 is a timing diagram showing a wake-up/sleep schedule of a computing device utilizing TWT, according to an example implementation of the present disclosure.

FIGS. 1-2 illustrate devices that communicate traffic streams some of which may be latency sensitive (e.g., those carrying periodic AR/VR information/content). As described herein, the periodic operation of TWT benefits communication of periodic traffic (e.g., latency sensitive traffic) by predictably communicating the periodic traffic. FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a SP. After the SP duration 404, the computing device 110 may enter a sleep state until the next TWT start time at 408. The interval of time between TWT start time 402 and TWT start time 408 may be considered the SP interval 406.

A TWT schedule may be communicated and/or negotiated using broadcast TWT (bTWT) and/or individual TWT (iTWT) signaling. In some embodiments, to signal iTWT, TWT schedule information may be communicated to particular (individual) devices using a mode such as a Network Allocation Vector (NAV) to protect the medium access of TWT SPs. In contrast, to signal bTWT, in some embodiments, a device (such as AP 105) may schedule TWT SPs with other devices (e.g., computing devices 110 and/or HWDs 150) and may share schedule information in beacon frames and/or probe response frames. Sharing schedule information using bTWT may reduce overhead (e.g., negotiation overhead) as compared to the overhead used when sharing information using iTWT.

The TWT mechanism may also be used in peer-to-peer (P2P) communication. For example, TWT may be defined for tunneled direct link setup (TDLS) pairs (e.g., non-AP STAs), soft APs (such as computing devices 110) and STAs (such as HWD 150), and/or peer-to-peer group owners (GO) and group clients (GC). For instance, a TDLS pair of devices (e.g., HWD 150 and computing device 110) can request TWT membership for its latency sensitive traffic over a channel. In another example, a group owner (GO), such as a computing device 110, may request TWT membership for latency sensitive traffic over the P2P link.

When P2P communication is established, various channel access rules may govern the P2P communication. An AP assisted P2P trigger frame sequence may reduce the contention/collision associated with TWT (or rTWT) in P2P communication. Accordingly, a P2P model where a P2P STA (e.g., a HWD 150) is not associated with an infra-basic service set (BSS) AP, may improve P2P communication. Without AP's assistance or coordination, a transmission over the P2P link may collide with another transmission in the BSS. In some embodiments, a reverse direction protocol (RDP) may be enabled for P2P communication. During RDP, when a transmitting STA has obtained a transmit opportunity (TXOP), the transmitting STA may grant permission for the receiving STA to transmit information back to the transmitting STA during the same TXOP. Accordingly, if a TWT setup allows P2P transmission and indicates RDP, the P2P communication can be performed after a triggered frame sequence (e.g., a reverse direction frame exchange). In other embodiments, other protocols may be enabled for P2P communication. In some embodiments, trigger-enabled TWT can reduce the medium contention and/or collisions between UL and DL transmissions. The trigger-enabled TWT may be indicated using a TWT information element (IE).

Figure 5:
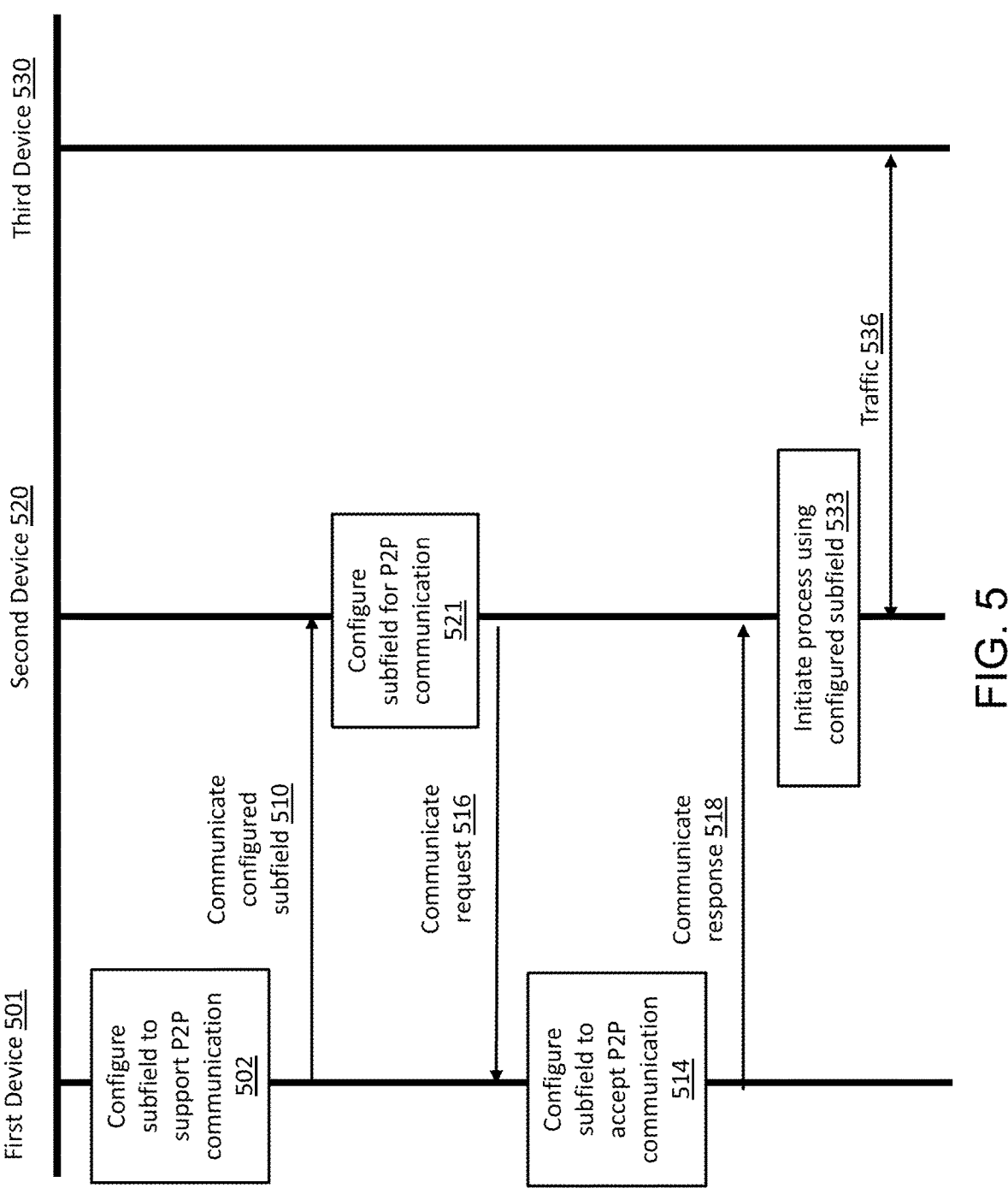
FIG. 5 is an interaction/flow diagram showing a process of signaling rTWT for P2P communication between three devices, according to example implementations of the present disclosure.

FIG. 5 illustrates an interaction/flow diagram showing a process 500 of configuring/enabling/extending rTWT for P2P communication, according to example implementations of the present disclosure. In some embodiments, the process 500 is performed by a first device 501 (e.g., a restricted TWT scheduling AP such as AP 105), a second device 520 (e.g., a TWT requesting STA/scheduled STA such as a computing devices 110, or a soft AP), and/or a third device 530 (e.g., a peer device to communicate over a P2P link with the TWT scheduled STA, such as another computing device 110 and/or HWD 150, or a TWT responding STA). The third device 530 may not be associated with the first device 501 and/or may not be in range of the first device 501. Extending rTWT for P2P communication may be executed using bTWT signaling and/or iTWT signaling. In some embodiments, the process 500 is performed by other entities. In some embodiments, the process 500 includes more, fewer, or different steps than shown in FIG. 5.

In some embodiments, the process 500 begins with operation 502 at the first device 501. In other embodiments, the process 500 begins with operation 521 at the second device 520.

In more details of operation 502, the first device 501 may configure a subfield extending rTWT for (e.g., to support) P2P communication. For example, the first device 501 may advertise and/or announce P2P support/capability of/in one or more rTWT SPs (e.g., using a beacon frame).

Figure 6:
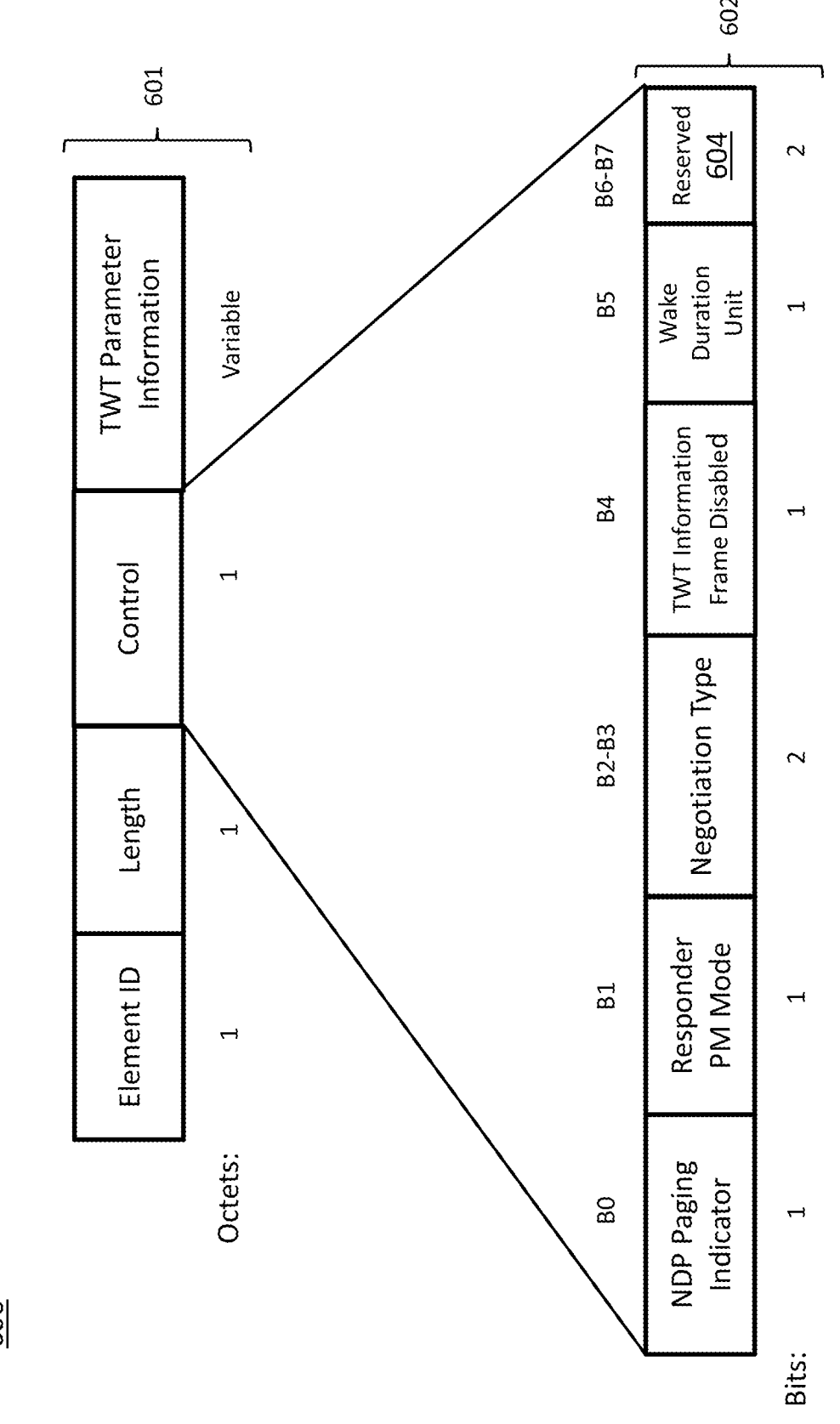
FIG. 6 is an example format of a TWT element field, according to an example implementation of the present disclosure.
Figure 7:
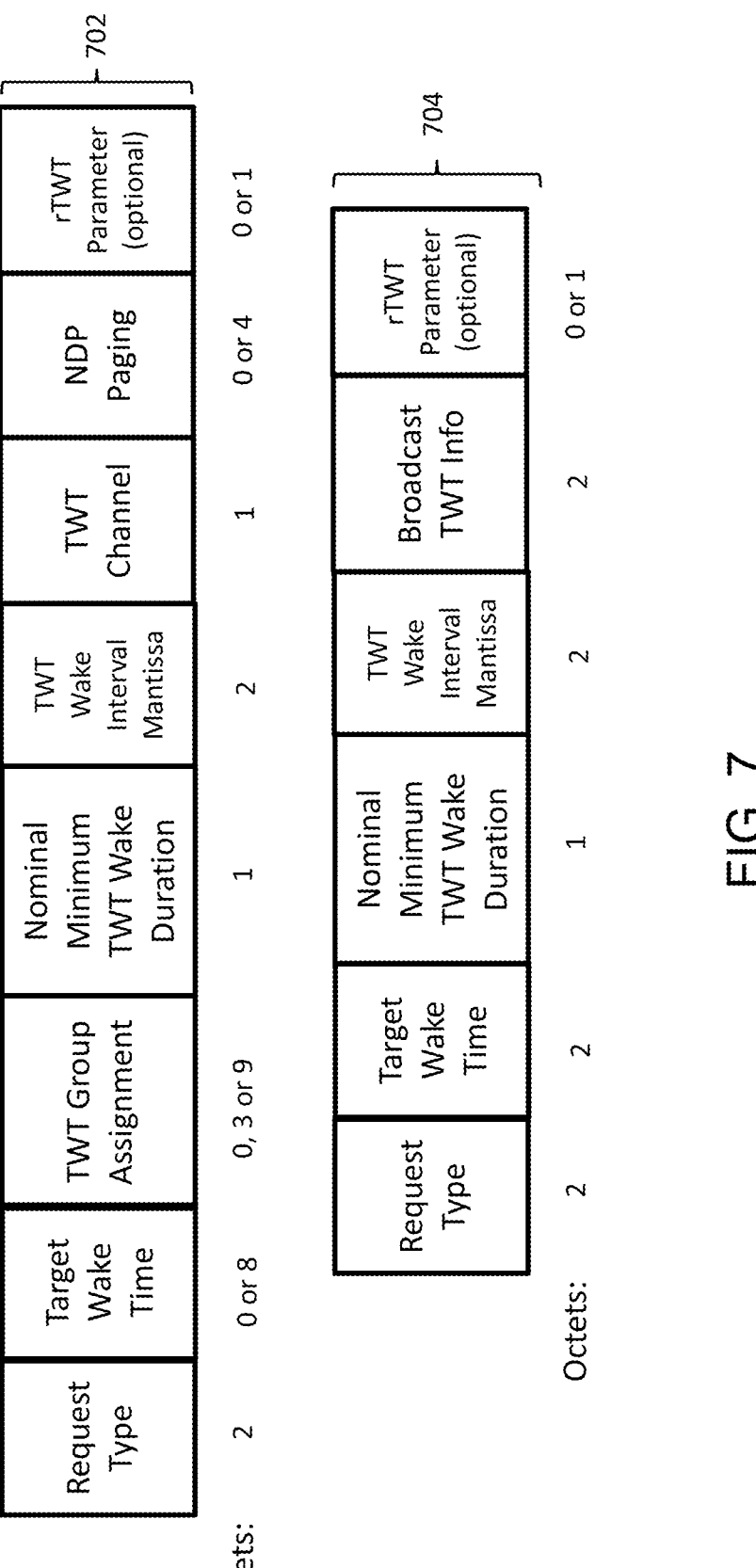
FIG. 7 is an example format of an amended TWT Parameter Set field, according to an example implementation of the present disclosure.

The subfield configured in operation 502 may be configured by using/adding (modifying, inserting) an rTWT Parameter subfield (e.g., an optional rTWT subfield) in the TWT Parameter Set Field format. The indication of the TWT Parameter Set Field containing the optionally added rTWT Parameter subfield (e.g., the indication of the presence or use of the rTWT Parameter subfield) may be indicated using one or more bits in a TWT element field, for instance. FIG. 6 is an example format 600 of a TWT element field, according to an example implementation of the present disclosure. The TWT Element 601 may include a Control subfield 602. The Control subfield 602 may include reserved bits 604. One or more bits of reserved bits 604 may be repurposed (modified/configured) to indicate the presence of the optional rTWT subfield appended to the TWT Parameter Set Field. In other embodiments, other bits (e.g., reserved bit(s) from within or outside the Control subfield 602) may be allocated to indicate that the optional rTWT subfield is appended to (or added into) the TWT Parameter Set Field. In an example, bit 6 (B6) for instance (a reserved bit) may indicate whether the rTWT Parameter subfield (e.g., the optional rTWT subfield) is appended to or added into the TWT Parameter Set Field), as indicated in FIG. 7, is being communicated. If bit 6 is set (or other repurposed bits are set), then the TWT Parameter Set field (as seen in FIG. 7) may include the rTWT Parameter subfield indicating rTWT P2P information.

FIG. 7 is an example format of an amended TWT Parameter Set field, according to an example implementation of the present disclosure. TWT Parameter Set field 702 is the TWT Parameter Set field used for iTWT signaling, while TWT Parameter Set field 704 is the TWT Parameter Set field used for bTWT signaling. Both the bTWT Parameter Set Field and iTWT Parameter Set field may be transmitted in any direction (e.g., from AP 105 to computing device 110 and/or from computing device 110 to AP 105), and in some cases, between STAs (e.g., in P2P communications or configurations). As shown, one or more bits of the TWT Parameter Set field 702, 704 may be added (or repurposed, modified, inserted) to include the optional rTWT Parameter subfield. It should be appreciated that the optional rTWT Parameter subfield may be inserted anywhere in the TWT Parameter Set field 702, 704. In some embodiments, the rTWT Parameter subfield may be 1 or more octets (e.g., the rTWT Parameter subfield may be added to the TWT Parameter Set field 702, 704). The rTWT Parameter subfield may indicate/include P2P information if an associated bit in the Control subfield 602 of the TWT Element 601 in FIG. 6 is set. If the associated bit in the Control subfield 602 of the TWT Element 601 in FIG. 6 is not set, the rTWT Parameter subfield may not indicate/include P2P information (e.g., the rTWT Parameter subfield may not be present in the TWT Parameter Set fields 702, 704).

Figure 8:
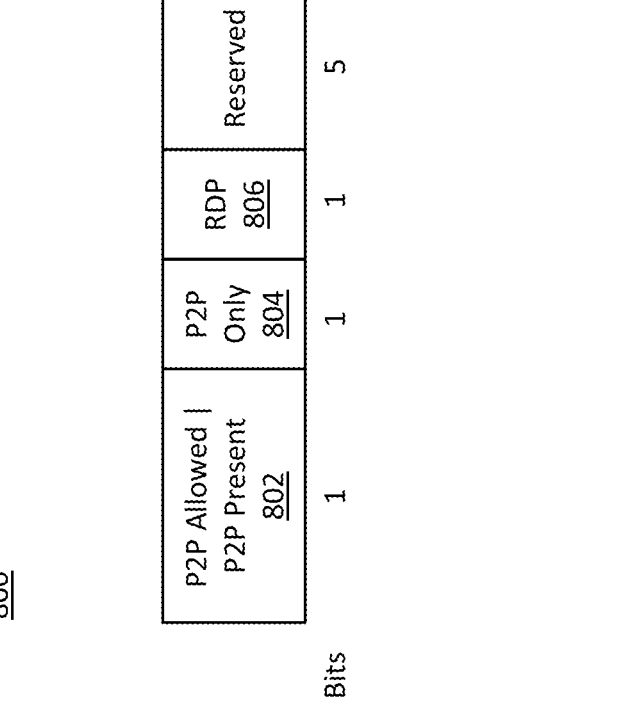
FIG. 8 is an example format of the rTWT Parameter subfield, according to an example implementation of the present disclosure.

FIG. 8 is an example format of the rTWT Parameter subfield 800, according to an example implementation of the present disclosure. In some embodiments, the rTWT Parameter subfield 800 may be at least 3 bits (e.g., 8 bits) for example. In other embodiments, the rTWT Parameter subfield 800 may be fewer or more bits. It should be appreciated that the bit position/arrangement in the rTWT Parameter subfield 800 may vary. In some embodiments, the bits in the rTWT Parameter subfield 800 may be interpreted differently based on the device transmitting the rTWT Parameter subfield 800.

When an AP transmits the rTWT Parameter subfield 800 in a frame, bit 0 (or any other predefined bit) 802 may indicate whether P2P is allowed or supported. For example, the first device 501 in FIG. 5, which may be a rTWT scheduling AP such as AP 105, may allow/support a SP to be used for P2P communication. For instance, if bit 0 802 is set, the AP may advertise that P2P communication is allowed/supported during one or more rTWT SPs. If bit 0 802 is not set, the AP may be advertising that the one or more rTWT SPs do not support P2P communication.

The AP may also advertise, using bit 1 (or any other predefined bit) 804, the type(s) of traffic supported during the one or more rTWT SPs. For example, if bit 1 804 is set, the AP may indicate that only P2P communication may be communicated during the one or more rTWT SPs. If bit 1 804 is not set, the AP may indicate that non-P2P communication may be communicated during the rTWT SP(s), or a mixture of P2P and non-P2P communication may be communicated during the rTWT SP(s) (e.g., some P2P traffic or streams of traffic, and some non-P2P traffic or streams of traffic).

In some embodiments, bit 2 (or any other predefined bit) 806 may be used to indicate a protocol that may govern the channel access rules/process/method for P2P communication during the rTWT SPs. For example, if bit 2 806 is set, the AP may inform the non-AP STA (e.g., computing device 110, or other rTWT scheduled STA) that RDP may govern/be the channel access method for the P2P communication during the rTWT SP. If bit 2 806 is not set, the AP may be informing the non-AP STA that RDP may not be used as the channel access method for the P2P communication. The rTWT Parameter subfield 800 may also contain reserved bits (e.g., bits 3 to 7).

Figure 9:
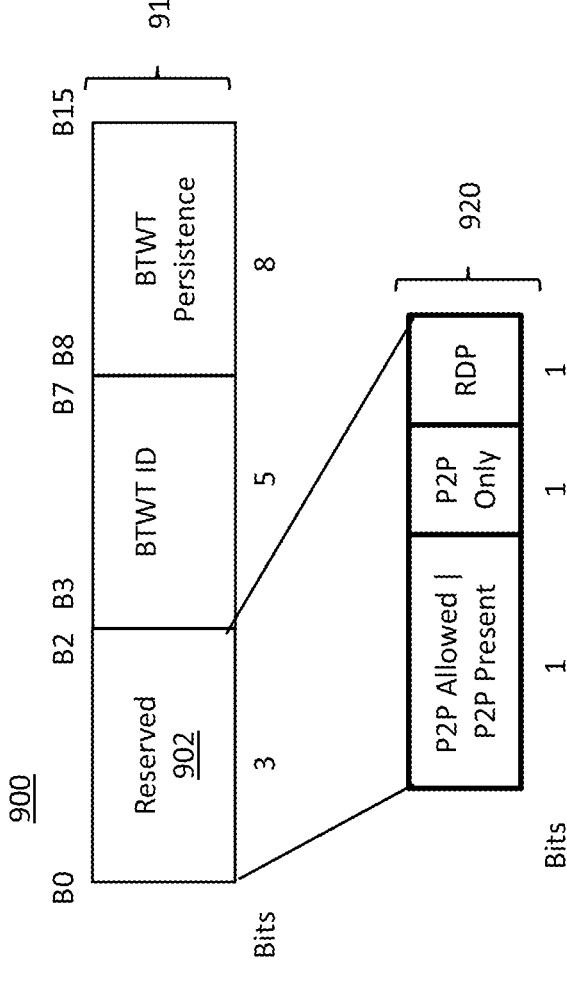
FIG. 9 is an example format of the bTWT Info Subfield, according to an example implementation of the present disclosure.

In other embodiments, rTWT may be extended for P2P communications by repurposing/modifying one or more bits in the bTWT Info Subfield format. FIG. 9 is an example format of the bTWT Info Subfield, according to an example implementation of the present disclosure. As shown, the reserved bits 902 of the bTWT Info Subfield may be repurposed/modified such that the rTWT Parameter Subfield 920 may be used to extend rTWT for P2P communications. In other embodiments, other bits (e.g., reserved bit(s) from within or outside the bTWT Info Subfield) may be allocated/configured to indicate the (presence or use of) optional rTWT Parameter subfield. The rTWT Parameter Subfield 920 may be the same as (or similar to structurally or operationally) the rTWT Parameter Subfield 800. In some embodiments, the interpretation of the bits in the rTWT Parameter subfield 920 may also have different interpretations based on the device transmitting the subfield (e.g., similar to the different interpretations of the rTWT Parameter subfield 800 in FIG. 8). In some implementations, the rTWT Parameter subfield 920 may not have the reserved bits similar to the rTWT Parameter subfield 800. In other implementations, other bits may be added/repurposed in the bTWT Info Subfield 910 such that other bits may be used in the rTWT Parameter subfield 920.

Referring back to FIG. 5, in operation 510, the first device 501 may transmit the configured subfield in a message/frame to the second device 520 (and/or other devices not shown). The second device 520 may receive, from the first device 501, an indication/advertisement that the first device 501 allows/supports the second device 520 (and/or the third device 530) to transmit or receive latency sensitive traffic over P2P links during rTWT SPs (e.g., P2P allowed, by setting bit 0 802 in FIG. 8 for instance). That is, the first device 501 may advertise support for P2P traffic during rTWT SPs. With the knowledge of this support acquired from the received configured subfield (e.g., in response to receiving the configured subfield from the first device 501), the second device 520 may configure a subfield requesting the extension of rTWT for P2P communication in operation 521.

The second device 520 may configure subfield in operation 521 to request to communicate latency sensitive traffic over a P2P link (e.g., between the second device 520 and the third device 530) during a rTWT SP. In some embodiments, the third device 530 may indicate to the second device 520 that the third device 530 has latency sensitive traffic that the third device 530 wants or is able to communicate over a P2P link during a rTWT SP. Additionally or alternatively, the second device 520 may determine that it has latency sensitive traffic that the second device 520 wants (or is able) to communicate over the P2P link during a rTWT SP to the third device 530. In response, the second device 520 may request the extension of rTWT for P2P traffic using the rTWT parameter subfield as discussed with reference to FIGS. 6-9 in operation 521. The second device 520 may intend to establish a rTWT agreement with the first device 501 such that during the rTWT SP, the DL/UL transmissions over the links (e.g., the link between the first device 501 and the second device 520, and/or the P2P link between the second device 520 and the third device 530) may be delivered. That is, the first device 501 and the second device 520 may negotiate to setup the rTWT schedule.

In more details of operation 521, the second device 520 may configure a subfield extending rTWT for P2P communication. The configured rTWT Parameter subfield (e.g., FIG. 8) may be in a bTWT Parameter Set field/iTWT Parameter Set field as described in FIG. 7, or a bTWT Info Subfield as described in FIG. 9. As described herein, if the second device 520 sets and transmits an rTWT Parameter subfield in the bTWT Parameter Set field and/or the iTWT Parameter Set field, the second device 520 may indicate the presence of the rTWT Parameter subfield via one or more bits in a TWT Element field (e.g. TWT Element 601 in FIG. 6).

Referring both to FIG. 5 and FIG. 8, in the case where the second device 520 transmits a request to the first device 501 (e.g., using the configured subfield in operation 521), the bits in the rTWT Parameter subfield 800 may be interpreted differently from the bits in the rTWT Parameter subfield 800 transmitted by the first device 501 when the first device 501 advertises the rTWT Parameter subfield 800 (e.g., via the configured subfield in operation 502). For example, when the second device 520 transmits the rTWT parameter subfield 800, bit 0 (or any other predefined bit) 802 may indicate whether the second device 520 (or other rTWT requesting STA) has P2P traffic to be included/communicated in the rTWT SP (e.g., whether P2P traffic is present). For instance, if bit 0 is set, the second device 520 may have P2P traffic. If bit 0 is not set, the second device 520 may not have P2P traffic to communicate.

Continuing with the example of the rTWT Parameter subfield 800 being included in a frame/message transmitted by the second device 520 (e.g., configured in operation 521), bit 1 (or any other bit) 804 may indicate the type of traffic to be transmitted during the rTWT SP (e.g., P2P only). For example, if bit 1 804 is set, the second device 520 may intend to only transmit P2P traffic during the rTWT SP. If bit 1 804 is not set, the second device 520 may transmit both P2P traffic and non-P2P traffic during the rTWT SP, or may transmit non-P2P traffic during the rTWT SP. In an example, bit 1 804 may be set (e.g., P2P only) if the second device 520 and the third device 530 intend to communicate with each other during the entire rTWT SP. In contrast, bit 1 804 may not be set if the second device 520 and the third device 520 intend to communicate with each other during a portion of the rTWT SP, and the second device 520 intends to communicate with the first device 501 during a second portion of rTWT SP, for example.

In some embodiments, the interpretation of bit 2 (or any other bit) 806 when the second device 520 transmits the rTWT Parameter subfield 800 may be the same (or similar structurally or operationally) interpretation as when the first device 501 transmits the rTWT Parameter subfield 800 in operation 502 (e.g., an indication of whether the RDP protocol governs/is the channel access method for the P2P communication).

In other embodiments, following (or in response to) the received message/frame containing the subfield from the first device 501 in operation 510, the second device 520 may initiate process(es) (e.g., in operation 533) using the received configured subfield. For example, the second device 520 may extract information from the subfield configured in operation 502.

If, after extracting information from the configured subfield received from the first device 501, the second device 520 determines that the first device 501 does not allow/support the transmission or reception of latency sensitive traffic over P2P links during rTWT SPs (e.g., in some embodiments, bit 0 802 in FIG. 8 is not set or is configured with the value 0), then the second device 520 may not communicate P2P traffic during rTWT SPs. If the first device 501 does allow/support the transmission or reception of latency sensitive traffic over P2P links during rTWT SPs (e.g., in some embodiments, bit 0 802 in FIG. 8 is set, to the value 1 for instance), the second device 520 and the third device 530 may communicate latency sensitive traffic over a P2P link during one or more rTWT SPs as shown in operation 536.

In operation 516, the second device 520 may transmit the configured subfield in a message/frame to the first device 501. In operation 514, the first device 501 may respond to the configured subfield received from the second device 520 by configuring a second subfield to accept the request of including P2P communication. In some embodiments, when the first device 501 responds to the request of the second device 520, the first device 501 may transmit an rTWT Parameter subfield response that mirrors the request from the second device 520 to indicate acknowledgement and/or approval of the request of the second device 520. For example, the bits in the rTWT Parameter subfield transmitted by the second device 520 to the first device 501 may be the same or similar as the bits in the rTWT Parameter subfield transmitted by the first device 501 in response. If the first device 501 accepts the request, the first device 501 may perform resource allocation and update the rTWT SP schedule. In other configurations, the first device 501 may transmit a response that modifies (or rejects, or alters) the request of the second device 520. In operation 518, the first device

501 may transmit the configured subfield in operation 514 (or other acknowledgement/rejection) to the second device 520 in a message/frame.

In more details of operation 533, and in some embodiments, the second device 520 may initiate a process using the response message received from the first device 501 in operation 518. For example, the second device 520 may extract the information from the response message to determine whether the first device 501 approved or rejected the rTWT Parameter subfield configured by the second device 520 in operation 521. If the rTWT SPs for P2P were approved, the second device 520 may transmit an indication to the third device 530 of approval of the rTWT SPs for P2P. If the rTWT SPs for P2P communication were not approved, the second device 520 may further negotiate with the first device 501.

In operation 536, the second device 520 and the third device 520 may communicate latency sensitive traffic over the P2P link during one or more rTWT SPs, if P2P communication is approved/supported (indicated via the configured subfield of the first device 501 at operation 514).

Certain devices may communicate according to rTWT operations to prioritize and reserve time periods for latency sensitive traffic. Meanwhile, legacy systems or devices that do not support rTWT operations may attempt to access the channel during the reserved time periods (e.g., rTWT service periods (SPs)) for devices that support rTWT operations. Without a mechanism to protect the reserved time periods and/or rTWT operations, the devices that do not support rTWT may interfere with the latency sensitive traffic.

To solve these problems, according to certain aspects, embodiments in the present disclosure relate to techniques for configuring a legacy/existing/specific communication system or device to support or conform to rTWT operations. In some embodiments, a device (e.g., a STA, an extreme high throughput (EHT) STA, a non-AP STA, or a STA of STA MLD) may support/follow/observe channel access rules that provide protection for rTWT-active or rTWT-supported users/devices. For example, a non-AP STA may support/follow/observe channel access rules that protect a start time of a rTWT SP.

In one approach, one or more access points and station devices, for example conforming to Wi-Fi standard may implement capability fields to protect rTWT operations (e.g., to protect rTWT service periods). In one approach, a device (e.g., access point or station device) can transmit (a message with) a rTWT operation support field that indicates whether the device can support rTWT operations (as a first capability). The rTWT operation support field may be set in an EHT capability field (or information element (IE)). If two devices (e.g., access point and station device) can support rTWT operations, then the two devices may operate according to rTWT operations (e.g., according to rTWT access rules). The rTWT operation support field set by an AP may indicate a capability of the AP such that the AP is a rTWT scheduling AP and can set up a rTWT schedule and/or establish a membership of the rTWT schedule. The rTWT operation support field set by a non-AP STA may indicate a capability of the non-AP STA such that the non-AP STA is a rTWT scheduled STA and can set up a rTWT schedule and/or establish a membership of the rTWT schedule.

In one approach, a device (e.g., access point or station device) that may or may not support rTWT operations (e.g., corresponding to its RTWT Operation Support" field) may specify (e.g., by transmitting a frame with) a restricted-TWT start time protection (RSTP) support capability field that indicates whether the device can support start time (window)

protection (as a second capability). For example, the RSTP support capability field may indicate whether the device supports access rules for protection of a service period (SP) reserved for or restricted to latency-sensitive traffic. The RSTP support capability field may be set in a EHT capability field (or IE). If a station device does not support the RSTP capability (e.g., does not send a frame announcing/indicating that its "RSTP Support" field is set to 1), and an access point is communicating with or scheduled to communicate with another device according to a rTWT operation, then the access point may refuse or reject association with the station device, such that the station device may not interfere with the (latency-sensitive or rTWT-based) communication between the access point and the another device. If the station device supports the RSTP capability (station device's RSTP support field is set to 1), then the access point may allow communication with the station device, but may cause or instruct (or be in agreement with) the station device to end its communication before the start of the service period allocated or reserved for the another device, according to access rules for rTWT operation. In some embodiments, a non-AP STA may support the channel access rules that protect a start time of a rTWT SP by obtaining a transmit opportunity (TXOP) before the start time of the rTWT SP and ending the TXOP before the start time of the rTWT SP. Accordingly, service/time periods reserved or allocated according to rTWT operations can be protected from interference by legacy or other devices that may not support or operate according to rTWT operations. Therefore, latency sensitive traffic, for example, for AR/VR content/applications, can be provided with reduced delay/latency through rTWT operations.

In one approach, capabilities of rTWT operation support (as the first capability) and/or RSTP support (as the second capability) can be indicated/specified in an information element (IE) of a frame (e.g., beacons, probe requests, response frame, etc.). In some embodiments, an EHT capabilities information element (IE) may include the fields of element ID, length, element ID extension, EHT MAC capabilities information, and/or EHT PHY capabilities information.

In some embodiments, the field of EHT MAC capabilities information may include the subfields of rTWT operation support, and/or rTWT Start Time Protection (RSTP) support. The subfield of rTWT operation support may be set by an AP and/or a non-AP STA. A device (e.g., AP or non-AP STA) may set the subfields of rTWT operation support and/or RSTP support to respective values in a frame, and send the frame to announce the values to one or more devices. In some embodiments, the subfield of rTWT operation support may be different from the field of rTWT capability. An EHT AP may set the subfield of rTWT operation support to 1 (support) or 0 (no support). An EHT non-AP STA may set the subfield of rTWT operation support to 1 (support) or 0 (no support).

In some embodiments, the subfield of RSTP support may be set by an AP and/or a non-AP STA. An EHT STA (e.g., non-AP STA) may set the subfield of RSTP support to 1 (support) or 0 (no support). An EHT STA that supports rTWT operations may set both the subfields of rTWT operation support and RSTP support to 1 in a frame, and broadcast/transmit the frame to notify other devices (e.g., AP). In some embodiments, an EHT non-AP STA may set the rTWT operation support subfield and the RSTP support subfield independently. In some embodiments, an EHT non-AP STA may set the RSTP support subfield to 1, if the STA sets the rTWT operation support subfield to 1. In some embodiments, the RSTP support subfield may not be available in frames sent/announced by an EHT AP.

In some embodiments, the field of EHT MAC capabilities information may include the subfields of National Security and Emergency Preparedness (NSEP) priority access support, EHT operating mode (OM) control support, triggered transmit opportunity (TXOP) sharing support, restricted TWT support, stream classification service (SCS) traffic description support, and/or reserved. The restricted TWT support subfield may indicate support for capabilities of rTWT operation support and/or RSTP support. In some embodiments, the restricted TWT support subfield may be two bits long. For example, a device (e.g., ETH STA or ETH AP) may set the restricted TWT support subfield to: (1) the (binary) value of 00 if rTWT is not implemented in the device (e.g., if RestrictedTWTImplemented is false); (2) the value of 01 (alternatively the value of 10) if the device supports/implements/follows channel access rules that protect the rTWT SP start time; and (3) the value of 10 (alternatively the value of 01) if the device supports/implements the rTWT operations which may or may not support/implement the channel access rules that protect the rTWT SP start time. The value of 11 may be reserved.

In one approach, an AP (e.g., EHT AP) may indicate whether the AP requires or prefers associated non-AP STAs to support rTWT operations (as the first capability) and/or support the channel access rules to protect the rTWT SP start time (as the second capability). In some embodiments, an EHT operation information element (IE) may be included in a management frame (e.g., beacon frame) so that the management frame may be broadcast/announced to an EHT STA which can get the channel configuration information from the EHT operation information element (e.g., if operating in the 6 GHz band).

In some embodiments, the EHT operation IE may include the fields of element ID, length, element ID extension, and/or EHT operation information. The EHT operation information field of the EHT operation IE and the EHT MAC capabilities information subfield of the EHT capabilities IE may be in different frames. The EHT operation information field may include the subfield of rTWT requirements to indicate whether an AP (e.g., EHT AP) requires or prefers associated non-AP STAs to support the channel access rules to protect the rTWT SP start time (as the second capability) and/or rTWT operations (as the first capability) which may or may not support the channel access rules to protect the rTWT SP start time.

In some embodiments, an rTWT scheduling AP may require an EHT non-AP STA to support RSTP (as the second capability) in order to associate with the AP, or in order to operate on a link over which the STA is associated with the AP. The AP may set the subfield of rTWT requirements (which is one bit long) to 1 to indicate that the AP requires an EHT non-AP STA to support RSTP. In some embodiments, the AP may set the rTWT requirements subfield of the EHT operation information field to 1 if the AP sets the rTWT operation support field of the EHT MAC capabilities information field is 1. If an AP sets the rTWT requirements subfield of the EHT operation information field to 1, during an association (or re-association), an EHT non-AP STA may be allowed to associate with the AP only if the STA's RSTP support field (of the EHT MAC capabilities information field) is set to 1.

Alternatively, in some embodiments, the subfield of rTWT requirements may be two bits long to indicate whether an AP (e.g., EHT AP) requires or prefers associated non-AP STAs to support the first capability and/or the second capability. For example, an AP (e.g., ETH AP) may set the rTWT requirements subfield to: (1) the (binary) value of 01 (or other specific value) to indicate that the AP prefers a non-AP STA to support the RSTP (as the second capability); (2) the value of 10 (or other specific value) to indicate the AP requires a non-AP STA to support the RSTP (as the second capability) such that the non-AP STA meets the requirement if the non-AP STA sets the rTWT support subfield in the EHT MAC capabilities information field (transmitted by the non-AP STA) to be 01 or 10; (3) the value of 11 (or other specific value) to indicate the AP requires a non-AP STA to support the rTWT operations (as the first capability) such that the non-AP STA meets the requirement if the non-AP STA sets the rTWT support subfield in the EHT MAC capabilities information field (transmitted by the non-AP STA) to be 10; and (4) the value of 00 otherwise. In some embodiments, the subfield of rTWT requirements may be reserved or unused for a non-AP STA (e.g., EHT non-AP STA).

In one approach, a STA (e.g., an AP STA or a non-AP STA) can transmit information to announce that the STA has a capability to support rTWT operations (as the first capability), and/or (at least) a capability to operate according to channel access rules to protect rTWT SP start time (as the second capability). In some embodiments, a STA may indicate that the STA supports the rTWT operations including the channel access rules that protect the restricted TWT SP start time (e.g., the first capability including the second capability). The one or more capabilities may be indicated in a capability information field (e.g., EHT MAC capabilities information field). The capability information field may be in an information element (IE) of a frame (e.g., beacon frame, probe request frame, etc.). In some embodiments, the one or more capabilities can be indicated in separate subfields independently (e.g., the subfields of rTWT operation support and RSTP support). In some embodiments, the one or more capabilities can be indicated in a single subfield (e.g., restricted TWT support subfield). For example, the restricted TWT support subfield may include two bits for instance. The restricted TWT support subfield may be set to (1) the binary value 00 to indicate that the STA does not support rTWT; (2) the binary value 01 (or other specific value) to indicate that the STA may not support rTWT operation, but may support RSTP; and (3) the binary value 10 to indicate that the STA supports rTWT operations (e.g., set up a rTWT schedule, and/or establish the membership of a rTWT schedule), and can support RST. The binary value 11 may be reserved or used for another purpose/function, for instance.

In one approach, an AP may transmit information to announce different requirements for association with STA(s) in a wireless network (e.g., BSS of a WLAN). In some embodiments, an AP can transmit/broadcast/share EHT operation information to notify rTWT requirements. For example, an AP can set the rTWT requirement subfield to 01 (or other value) to indicate that the AP prefers a non-AP STA to support RSTP (e.g., met by binary value 01 or 10 in the restricted TWT support subfield of the capability information field). An AP can set the rTWT requirement subfield to the binary value 10 (or other value) to indicate that the AP requires a non-AP STA to support RSTP (e.g., met by binary value 01 or 10 in the restricted TWT support subfield of the capability information field). An AP can set the rTWT requirement field to the binary value 11 (or other value) to indicate that AP requires a non-AP STA to support the rTWT operations (e.g., met by binary value 10 in the restricted TWT support subfield of the capability information field).

In one approach, upon receiving information relating to capabilities of a non-AP STA specified in a frame (e.g., probe request frame or an association request frame), an AP may determine whether a requirement or preference of an AP is met by the capabilities of the non-AP STA. In response to determining that requirement or preference of the AP is not met and the non-AP STA is already associated, then the AP may disassociate with the non-AP STA as a non-conforming STA by sending a disassociation frame. In response to determining that requirement or preference of the AP is not met and the frame is an association request frame (sent in the process of associating), then the AP may not associate with the non-AP STA as a non-conforming STA.

In some embodiments, if an AP sets the rTWT requirement subfield to the binary value 01 (indicating the AP's preference for the RSTP support as the second capability), upon receiving, from a non-AP STA, a frame including the restricted TWT support subfield set to neither binary value 01 nor binary value 10, the AP may determine to disassociate with, or not associate with, the non-AP STA as a non-conforming STA, depending on one or more non-TWT conditions including at least one of a traffic condition, a load condition, or a channel condition. For example, the AP may determine whether the one or more non-TWT conditions are bad, and in response to determining that the one or more non-TWT conditions are bad (e.g., a value indicating the non-TWT conditions is less than a threshold value), the AP may disassociate with, or not associate with, the non-AP STA. In response to determining that the one or more non-TWT conditions are good (e.g., a value indicating the non-TWT conditions is greater than or equal to the threshold value), the AP may associate with, or maintain association with, the non-AP STA. In determining whether the one or more non-TWT conditions are bad, the AP may monitor wireless traffic on the current operating channel by setting a wireless adaptor (e.g., wireless network interface 320) in a monitor mode or promiscuous mode, monitor a network load by obtaining BSS load information that indicates the number of STAs associated with a specific BSS or a usage level of a channel, or the like, and/or perform one or more measurements on the current operating wireless channel. The measurements may use metrics including at least one of signal strength such as received signal strength indicator (RSSI), signal-to-noise ratio (SNR), or packet error rate of wireless signals. For example, when the rTWT requirement subfield is set to 1, in response to determining that a value indicating a load condition (e.g., BSS load on uplink (UL) or downlink (DL)) is greater than or equal to a load threshold, and/or a value indicating a channel condition (e.g., RSSI) is greater than or equal to a channel threshold, the AP may determine to associate with, or maintain association (if already associated) with, a non-conforming STA (having neither binary value 01 nor binary value 10 in the restricted TWT support subfield of the capability information field).

In some embodiments, if an AP sets the rTWT requirement subfield to the binary value 10 (indicating the AP's requirement for the RSTP support as the second capability), upon receiving, from a non-AP STA, a frame including the restricted TWT support subfield set to neither binary value 01 (indicating the second capability) nor binary value 10 (indicating the first capability), the AP may determine to disassociate with, or not associate with, the non-AP STA as a non-conforming STA. On the other hand, upon receiving, from a non-AP STA, a frame including the restricted TWT support subfield set to the binary value 01 (indicating the second capability), the AP may determine to associate with (during an association process), or maintain association with (if already associated), the non-AP STA. In some embodiments, if the binary value 10 in the restricted TWT support subfield (indicating support of the first capability) also indicates support of the second capability, upon receiving, from a non-AP STA, a frame including the restricted TWT support subfield set to the binary value 01 or the binary value 10, the AP may determine to associate with, or maintain association with, the non-AP STA.

In some embodiments, if an AP sets the rTWT requirement subfield to the binary value 11 (indicating the AP's requirement for support of the rTWT operations as the first capability), upon receiving, from a non-AP STA, a frame including the restricted TWT support subfield not set to the binary value 10 (indicating the first capability), the AP may determine to disassociate with, or not associate with, the non-AP STA as a non-conforming STA. On the other hand, upon receiving, from a non-AP STA, a frame including the restricted TWT support subfield set to the binary value 10 (indicating the first capability), the AP may determine to associate with (during an association process), or maintain association with (if already associated), the non-AP STA.

In some embodiments, the STA may keep/track/store TWT capabilities announcements and/or TWT requirements received from APs. The STA may determine to send an association request frame to a particular AP based on the TWT capabilities announcements and/or TWT requirements received from the particular AP, and send, if determined, an association request frame to the particular AP.

In some embodiments, the AP may keep/track/store TWT capabilities announcements received from STAs. Upon receiving an association request from a particular STA, the AP may determine whether the AP associates with the particular STA, based on the TWT capabilities announcements received from the particular STA. The AP may then send, to the particular AP, an association response frame indicating whether the association request is accepted/approved. If the particular STA is already associated with the AP, the AP may determine whether the AP maintains association with the particular STA, based on the TWT capabilities announcements received from the particular STA. If the AP determines that the AP no longer maintains association with the particular STA, the AP may send a disassociation frame to the particular STA.

In one approach, an AP may be one AP STA of an AP MLD which has a plurality of AP STAs. Here, an MLD is a device that can perform transmissions and receptions on more than one wireless interface link. In this configuration, each AP STA of the AP MLD may receive announcements that a STA (e.g., a non-AP STA or a STA of non-AP MLD) has a capability to support rTWT operations (as the first capability), and/or (at least) a capability to operate according to channel access rules to protect rTWT SP start time (as the second capability). Each AP STA of the AP MLD can transmit information to announce that the AP STA has a capability to support rTWT operations (as the first capability), and/or (at least) a capability to support RSTP (as the second capability). Each AP STA of the AP MLD can transmit information to announce different requirements for association with STA(s) in a wireless network using the rTWT requirement subfield of the EHT operation information field.

In some embodiments, a STA may perform communication relating to association/disassociation with an AP MLD per link basis (e.g., communicating with a selected link of the AP MLD). The STA may perform communication relating to association/disassociation with an AP STA of the AP MLD in a manner similar to that of the STA perform communication relating to association/disassociation with a non-MLD AP. For example, the STA can send an association request to the AP STA of the AP MLD, the AP STA of the AP MLD can send an association response to the STA, and/or the AP STA of the AP MLD can send disassociation to the STA, in a manner similar to that of communication between the STA and a non-MLD AP.

In some embodiments, if the rTWT requirement subfield of the EHT operation information field functions as the subfield of "RSTP support required" to indicate whether an RSTP support is required, an AP MLD may set the subfield of RSTP support required to be 0 or 1 on selected links of the AP MLD. For example, in an AP MLD in which there is/exists at least one link that does not require RSTP support, if there is any legacy non-AP STA present or any EHT non-AP STA present that does not support RSTP on a link, the AP MLD may set the RSTP support required subfield to 0 for that link. In some embodiments, an AP MLD may only set the RSTP support required subfield to 1 on a 6 GHz link of the AP MLD if available, which is a first generation, green channel and no legacy link. If an AP MLD does not support 6 GHz links, the AP MLD may set the RSTP support required subfield to 1 on a selected 5 GHz link of the AP MLD. In some embodiments, an AP MLD may only set the RSTP support required subfield to 1 on a 5 GHz link of the AP MLD if available. If an AP MLD does not support 5 GHz links, the AP MLD may set the RSTP support required subfield to 1 on a selected 6 GHz link of the AP MLD.

In one approach, a device may include one or more processors. The one or more processors may determine a capabilities code indicating at least one of a plurality of defined capabilities of the device relating to rTWT operations in a WLAN. The one or more processors may wirelessly transmit, via a transmitter, a first frame including the capabilities code.

In some embodiments, the first frame may be a management frame including an information element (IE). The capabilities code may be included in the IE of the management frame. In some embodiments, the plurality of defined capabilities may include a capability to perform the rTWT operations. The rTWT operations may include at least one of setting up a rTWT schedule or establishing a membership of a rTWT schedule.

In some embodiments, the plurality of defined capabilities may include a capability to complete or terminate a transmission by a start time of a rTWT service period (SP) assigned to another device. The one or more processors may be configured to obtain a transmit opportunity (TXOP) before the start time such that a duration of the TXOP ends before the start time.

In one approach, an access point may include one or more processors. The one or more processors may determine a configuration indicating a preference or requirement relating to restricted target wake time (rTWT) operations for a device to associate with the access point in a wireless local area network (WLAN). The one or more processors may receive a first frame from the device, the first frame indicating a request for association with the access point and including a capabilities code indicating at least one of a plurality of defined capabilities of the device. The one or more processors may determine, according to the configuration and the capabilities code, whether to accept the request.

In some embodiments, the one or more processors may be configured to determine whether the capabilities code indicates one or more capabilities relating to the rTWT operations. In response to the capabilities code not indicating one or more capabilities relating to the rTWT operations, the one or more processors may be configured to reject the request.

In some embodiments, the capabilities code may indicate at least one of (1) a capability that does not relate to the rTWT operations, (2) a first rTWT capability to complete or terminate a transmission by a start time of a rTWT service period (SP) assigned to another device, or (3) a second rTWT capability to perform the rTWT operations. The configuration may indicate one of (1) a preference that the device supports the first rTWT capability, (2) a requirement that the device supports the first rTWT capability, or (3) a requirement that the device supports the second rTWT capability. In response to (1) the configuration indicating the preference for the first rTWT capability and (2) the capabilities code neither indicating the first rTWT capability nor the second rTWT capability, the one or more processors may be configured to determine, according to one or more conditions of the access point, whether the request is accepted, the one or more conditions including at least one of a traffic condition, a load condition, or a channel condition. In some embodiments, in response to (1) the configuration indicating the requirement of the first capability and (2) the capabilities code indicating the first capability, the one or more processors may be configured to determine to accept the request, and transmit, to the device, a response frame in response to the first frame.

Embodiments in the present disclosure have at least the following advantages and benefits.

First, embodiments in the present disclosure can provide useful techniques for providing a mechanism for a device to transmit a rTWT operation support field that indicates whether the device can support rTWT operations. Accordingly, if the rTWT operation support fields of two devices indicate that the two devices can support rTWT operations, then the two devices may operate according to rTWT operations or rTWT access rules. In this manner, devices can perform rTWT operations (e.g., for latency sensitive traffic/applications) without interference of devices that do not support rTWT.

Second, embodiments in the present disclosure can provide useful techniques for providing a mechanism for a device (e.g., STA) to specify a RSTP support capability field that indicates whether the device can support start time (window) protection of a rTWT SP. If the STA sets the RSTP support capability field to indicate that the STA can support start time protection of a rTWT SP, then an AP may allow communication with the STA. If the STA does not specify the RSTP support capability field, then the AP may not allow communication with the STA. Accordingly, service/time periods reserved or allocated according to rTWT operations can be protected from interference by legacy or other devices that may not support or operate according to rTWT operations. Therefore, latency sensitive traffic, for example, for AR/VR content/applications, can be provided with reduced delay/latency through rTWT operations.

Third, embodiments in the present disclosure can provide useful techniques for providing a mechanism for an AP to indicate whether the AP requires or prefers an associated non-AP STAs to support channel access rules to protect an rTWT SP start time and/or rTWT operations. In this manner, the AP can selectively associate/disassociate a non-AP STA based on the requirement/preference of the AP and the rTWT-related capabilities of the non-AP STA.

Figure 10A:
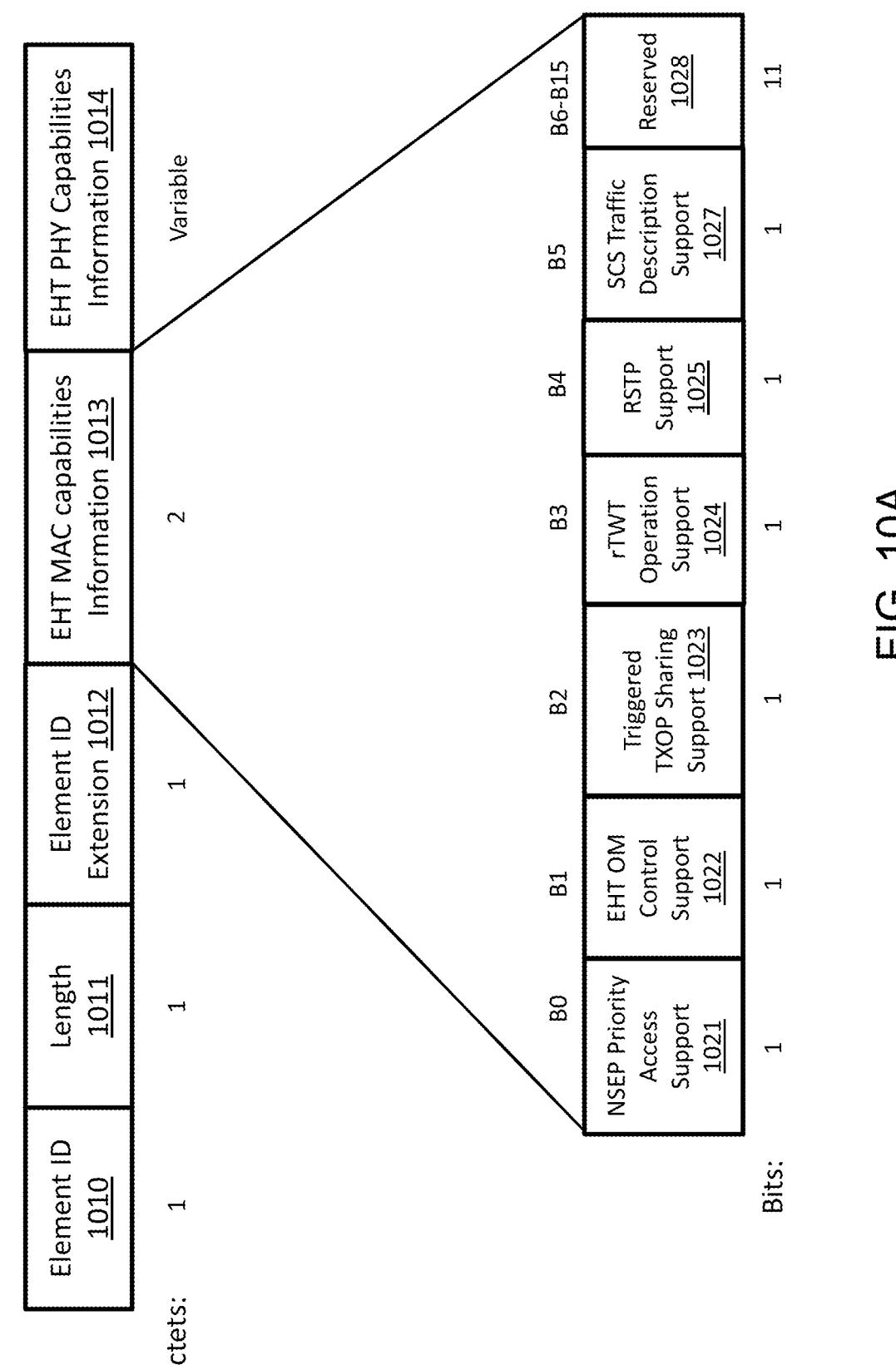
FIG. 10A is an example format of the field of extreme high throughput (EHT) capabilities element, according to an example implementation of the present disclosure.

FIG. 10A is an example format of the field of extreme high throughput (EHT) capabilities element (or information element (IE)) 1000, according to an example implementation of the present disclosure. In some embodiments, capabilities of rTWT operation support (as the first capability) and/or RSTP support (as the second capability) can be indicated/specified in the EHT capabilities IE 1000 which is an information element (IE) of a frame (e.g., beacons, probe requests, response frame, etc.). In some embodiments, the EHT capabilities IE 1000 may include the fields of element ID 1010, length 1011, element ID extension 1012, EHT MAC capabilities information 1013, and/or EHT PHY capabilities information 1014.

In some embodiments, the field of EHT MAC capabilities information 1013 may include the subfields of National Security and Emergency Preparedness (NSEP) priority access support 1021, EHT operating mode (OM) control support 1022, triggered transmit opportunity (TXOP) sharing support 1023, rTWT operation support 1024, rTWT Start Time Protection (RSTP) support 1025, stream classification service (SCS) traffic description support 1027, and/or reserved 1028. The subfield of rTWT operation support 1024 may be set by an AP and/or a non-AP STA. A device (e.g., AP or non-AP STA) may set the subfields of rTWT operation support and/or RSTP support to respective values in a frame, and send the frame to announce the values to one or more devices. In some embodiments, the subfield of rTWT operation support 1024 may be different from the field of rTWT capability. An EHT AP may set the subfield of rTWT operation support 1024 to 1 (support) or 0 (no support). An EHT non-AP STA may set the subfield of rTWT operation support 1024 to 1 (support) or 0 (no support).

In some embodiments, the subfield of RSTP support 1025 may be set by an AP and/or a non-AP STA. An EHT STA (e.g., non-AP STA) may set the subfield of RSTP support 1025 to 1 (support) or 0 (no support). An EHT STA that supports rTWT operations may set both the subfields of rTWT operation support 1024 and RSTP support 1025 to 1 in a frame, and broadcast/transmit the frame to notify other devices (e.g., AP). In some embodiments, an EHT non-AP STA may set the rTWT operation support subfield 1024 and the RSTP support subfield 1025 independently. In some embodiments, an EHT non-AP STA may set the RSTP support subfield 1025 to 1, if the STA sets the rTWT operation support subfield 1024 to 1. In some embodiments, the RSTP support subfield 1025 may not be available in frames sent/announced by an EHT AP.

Figure 10B:
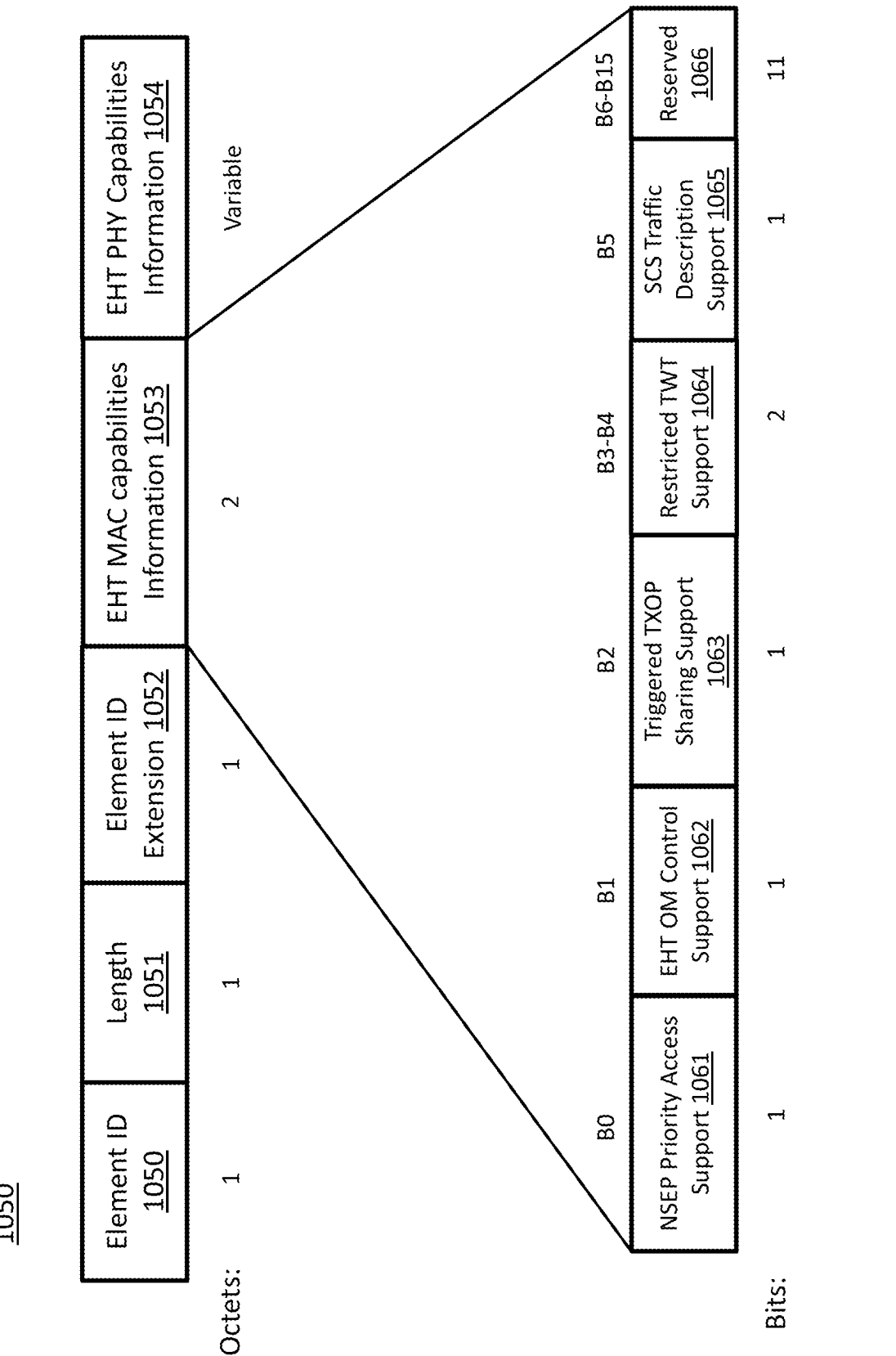
FIG. 10B is another example format of the field of EHT capabilities element, according to an example implementation of the present disclosure.

FIG. 10B is another example format of the field of EHT capabilities element (or EHT capabilities IE) 1050, according to an example implementation of the present disclosure. The EHT capabilities IE 1050 may include the fields of element ID 1050, length 1051, element ID extension 1052, and/or EHT PHY capabilities information 1054 which are defined similarly to the fields of element ID 1010, length 1011, element ID extension 1012, and/or EHT PHY capabilities information 1014 in the EHT capabilities IE 1050, respectively. The EHT capabilities IE 1050 may include the field of EHT MAC capabilities information 1053. The EHT MAC capabilities information 1053 may include the subfields of NSEP priority access support 1061, EHT OM control support 1062, TXOP sharing support 1063, SCS traffic description support 1065, and/or reserved 1065, which are defined similarly to the subfields of NSEP priority access support 1021, EHT OM control support 1022, TXOP sharing support 1023, SCS traffic description support 1027, and/or reserved 1028 in the EHT MAC capabilities information 1013, respectively.

In some embodiments, the field of EHT MAC capabilities information 1053 may include the subfields of restricted TWT support 1064. The restricted TWT support subfield 1064 may indicate support for capabilities of rTWT operation support (as the first capability) and/or RSTP support (as the second capability). In some embodiments, the restricted TWT support subfield 1053 may be two bits long. For example, a device (e.g., ETH STA or ETH AP) may set the restricted TWT support subfield 1053 to: (1) the (binary) value of 00 if rTWT is not implemented in the device (e.g., if RestrictedTWTImplemented is false); (2) the value of 01 (alternatively the value of 10) if the device supports/implements/follows channel access rules that protect the rTWT SP start time; and (3) the value of 10 (alternatively the value of 01) if the device supports/implements the rTWT operations which may or may not support/implement the channel access rules that protect the rTWT SP start time. The value of 11 may be reserved.

Figure 11:
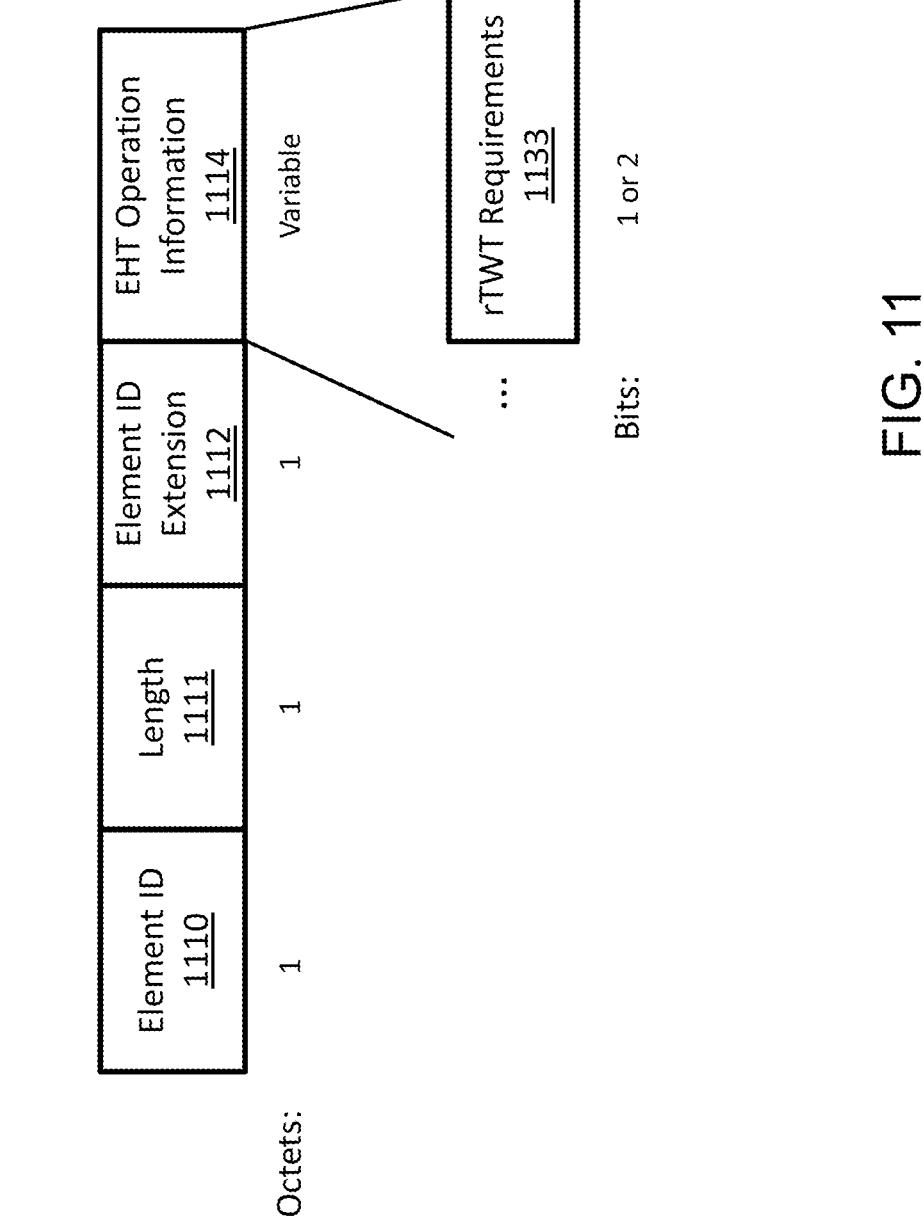
FIG. 11 is an example format of the field of EHT operation element, according to an example implementation of the present disclosure.

FIG. 11 is an example format of the field of EHT operation element (or EHT operation IE) 1100, according to an example implementation of the present disclosure. In some embodiments, an AP (e.g., EHT AP) may indicate whether the AP requires or prefers associated non-AP STAs to support rTWT operations (as the first capability) and/or support the channel access rules to protect the rTWT SP start time (as the second capability). In some embodiments, the EHT operation IE 1100 may be included in a management frame (e.g., beacon frame) so that the management frame may be broadcast/announced to an EHT STA which can get the channel configuration information from the EHT operation information element (e.g., if operating in the 6 GHz band).

In some embodiments, the EHT operation IE 1100 may include the fields of element ID 1110, length 1111, element ID extension 1112, and/or EHT operation information 1114. The EHT operation information field 1114 of the EHT operation IE 1100 (see FIG. 11) and the EHT MAC capabilities information subfield 1013, 1053 of the EHT capabilities IE 1000, 1050 (see FIG. 10A and FIG. 10B) may be in different frames. The EHT operation information field 1114 may include the subfield of rTWT requirements 1133 to indicate whether an AP (e.g., EHT AP) requires or prefers associated non-AP STAs to support the channel access rules to protect the rTWT SP start time (as the second capability) and/or rTWT operations (as the first capability) which may or may not support the channel access rules to protect the rTWT SP start time.

In some embodiments, the subfield of rTWT requirements 1133 may be one bit long. A rTWT scheduling AP may require an EHT non-AP STA to support RSTP (as the second capability) in order to associate with the AP, or in order to operate on a link over which the STA is associated with the AP. The AP may set the subfield of rTWT requirements 1133 (which is one bit long) to 1 to indicate that the AP requires an EHT non-AP STA to support RSTP. In some embodiments, the AP may set the rTWT requirements subfield 1133 of the EHT operation information field to 1 if the AP sets the rTWT operation support field 1024 of the EHT MAC capabilities information field 1013 is 1. If an AP sets the rTWT requirements subfield 1133 of the EHT operation information field to 1, during an association (or re-association), an EHT non-AP STA may be allowed to associate with the AP only if the STA's RSTP support field 1025 (of the EHT MAC capabilities information field 1013) is set to 1.

Alternatively, in some embodiments, the subfield of rTWT requirements 1133 may be two bits long to indicate whether an AP (e.g., EHT AP) requires or prefers associated non-AP STAs to support the first capability and/or the second capability. For example, an AP (e.g., ETH AP) may set the rTWT requirements subfield 1133 to: (1) the (binary) value of 01 (or other specific value) to indicate that the AP prefers a non-AP STA to support the RSTP (as the second capability); (2) the value of 10 (or other specific value) to indicate the AP requires a non-AP STA to support the RSTP (as the second capability) such that the non-AP STA meets the requirement if the non-AP STA sets the rTWT support subfield 1064 in the EHT MAC capabilities information field 1053 (transmitted by the non-AP STA) to be 01 or 10; (3) the value of 11 (or other specific value) to indicate the AP requires a non-AP STA to support the rTWT operations (as the first capability) such that the non-AP STA meets the requirement if the non-AP STA sets the rTWT support subfield 1064 in the EHT MAC capabilities information field 1053 (transmitted by the non-AP STA) to be 10; and (4) the value of 00 otherwise. In some embodiments, the subfield of rTWT requirements 1133 may be reserved or unused for a non-AP STA (e.g., EHT non-AP STA).

Figure 12:
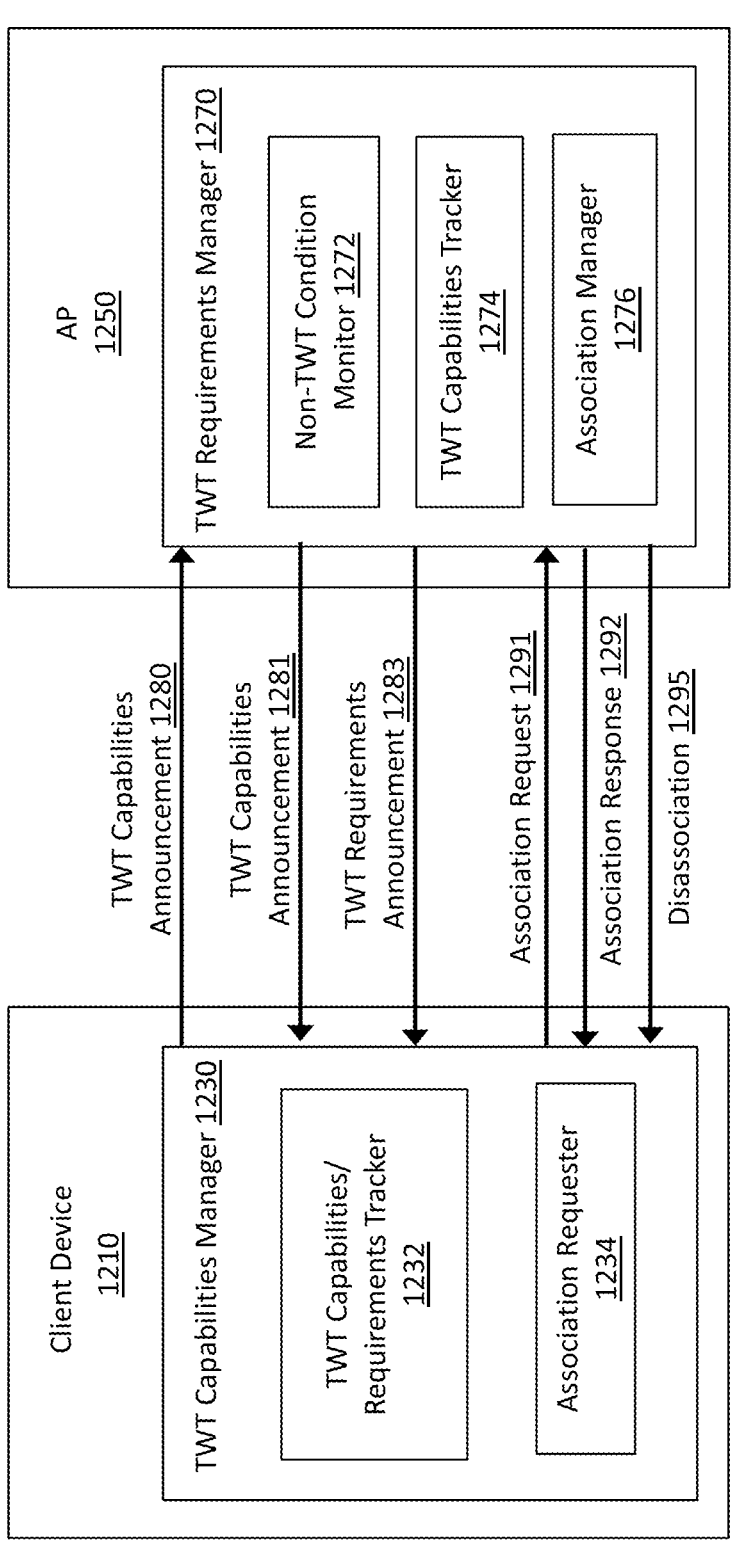
FIG. 12 is a block diagram of a system environment in which a client device and an AP communicate data relating to rTWT capabilities and requirements, according to an example implementation of the present disclosure.

FIG. 12 is a block diagram of a system environment 1200 in which a client device 1210 and an AP 1250 communicate data relating to rTWT capabilities and requirements, according to an example implementation of the present disclosure. The client device 1210 may be a non-AP STA, a HWD, or a computing device. In some embodiments, the device 1210 may include a TWT capabilities manager 1230 to communicate data relating to rTWT capabilities of the device 1210. In some embodiments, the TWT capabilities manager 1230 includes an electronic component or a combination of an electronic component and a software component. For example, the TWT capabilities manager 1230 may include a TWT capabilities/requirements tracker 1232 configured to keep/track/store rTWT requirements received from other devices (e.g., APs) and/or an association requester 1234 configured to send an association request to a AP with which the client device 1210 is to associate.

In some embodiments, the AP 1250 may be an AP, a soft AP or a computing device in a WLAN. In some embodiments, the AP 1250 may include a TWT requirements manager 1270 to communicate data relating to rTWT requirements/preference of the AP 1250. In some embodiments, the TWT requirements manager 1270 includes an electronic component or a combination of an electronic component and a software component. For example, the TWT requirements manager 1270 may include a non-TWT condition monitor 1272 configure to monitor one or more non-TWT conditions, a TWT capabilities tracker 1272 configured to keep/track/store rTWT capabilities received from other devices (e.g., client devices), and/or an association manager 1274 configured to send an association response to a client device from which a request for association is received or send a disassociation to a client already associated with the AP 1250.

In some embodiments, a STA (e.g., client device 1210 or AP 1250) can transmit information (e.g., TWT capabilities announcement 1280 transmitted by the client device 1210, TWT capabilities announcement 1281 transmitted by the AP 1250) to announce that the STA has a capability to support rTWT operations (as the first capability), and/or (at least) a capability to operate according to channel access rules to protect rTWT SP start time (as the second capability). In some embodiments, a STA may indicate that the STA supports the rTWT operations including the channel access rules that protect the restricted TWT SP start time (e.g., the first capability including the second capability). The one or more capabilities may be indicated in a capability information field (e.g., EHT MAC capabilities information field 1000, 1050). The capability information field may be in an information element (IE) of a frame (e.g., beacon frame, probe request frame, etc.). In some embodiments, the one or more capabilities can be indicated in separate subfields independently (e.g., the subfields of rTWT operation support 1024 and RSTP support 1025 of the ETH MAC capabilities field 1013). In some embodiments, the one or more capabilities can be indicated in a single subfield (e.g., restricted TWT support subfield 1064 of the ETH MAC capabilities field 1053). For example, the restricted TWT support subfield 1064 may include two bits for instance. The restricted TWT support subfield 1064 may be set to (1) the binary value 00 to indicate that the STA does not support rTWT; (2) the binary value 01 (or other specific value) to indicate that the STA may not support rTWT operation, but may support RSTP; and (3) the binary value 10 to indicate that the STA supports rTWT operations (e.g., set up a rTWT schedule, and/or establish the membership of a rTWT schedule), and can support RSTP. The binary value 11 may be reserved or used for another purpose/function, for instance.

In some embodiments, the AP 1250 (or the TWT requirement manager 1270) may transmit information to announce different requirements (e.g., TWT requirements announcement 1283) for association with STA(s) in a wireless network (e.g., BSS of a WLAN). In some embodiments, the AP 1250 can transmit/broadcast/share EHT operation information to notify rTWT requirements. For example, the AP 1250 can set the rTWT requirement subfield 1133 to 01 (or other value) to indicate that the AP prefers a non-AP STA to support RSTP (e.g., met by binary value 01 or 10 in the restricted TWT support subfield 1064 of the capability information field 1053). the AP 1250 can set the rTWT requirement subfield 1133 to the binary value 10 (or other value) to indicate that the AP requires a non-AP STA to support RSTP (e.g., met by binary value 01 or 10 in the restricted TWT support subfield 1064 of the capability information field 1053). The AP 1250 can set the rTWT requirement field 1133 to the binary value 11 (or other value) to indicate that AP requires a non-AP STA to support the rTWT operations (e.g., met by binary value 10 in the restricted TWT support subfield 1064 of the capability information field 1053).

In some embodiments, upon receiving information relating to capabilities of a non-AP STA (e.g., client device 1210) specified in a frame (e.g., probe request frame or an association request frame), the AP 1250 (or the TWT capabilities tracker 1274) may determine whether a requirement or preference of an AP is met by the capabilities of the non-AP STA. In response to determining that requirement or preference of the AP is not met and the non-AP STA is already associated, then the AP (or the association manager 1276) may disassociate with the non-AP STA as a non-conforming STA by sending a disassociation frame. In response to determining that requirement or preference of the AP is not met and the frame is an association request frame (e.g., association request 1291), then the association manager 1276 may not cause the AP 1250 to associate with the non-AP STA as a non-conforming STA.

In some embodiments, if the AP 1250 sets the rTWT requirement subfield 1133 to the binary value 01 (indicating the AP's preference for the RSTP support as the second capability), upon receiving, from a non-AP STA (e.g., client device 1210), a frame including the restricted TWT support subfield 1133 set to neither binary value 01 nor binary value 10, the AP (or TWT capabilities tracker 1274) may determine to disassociate with, or not associate with, the non-AP STA as a non-conforming STA, depending on one or more non-TWT conditions including at least one of a traffic condition, a load condition, or a channel condition. For example, the AP 1250 (or the non-TWT condition monitor 1272) may determine whether the one or more non-TWT conditions are bad, and in response to determining that the one or more non-TWT conditions are bad (e.g., a value indicating the non-TWT conditions is less than a threshold value), the AP (or the association manager 1276) may disassociate with, or not associate with, the non-AP STA. In response to determining that the one or more non-TWT conditions are good (e.g., a value indicating the non-TWT conditions is greater than or equal to the threshold value), the AP (or the association manager 1276) may associate with, or maintain association with, the non-AP STA. In determining whether the one or more non-TWT conditions are bad, the (or the association manager 1276) may monitor wireless traffic on the current operating channel by setting a wireless adaptor (e.g., wireless network interface 320) in a monitor mode or promiscuous mode, monitor a network load by obtaining BSS load information that indicates the number of STAs associated with a specific BSS or a usage level of a channel, or the like, and/or perform one or more measurements on the current operating wireless channel. The measurements may use metrics including at least one of signal strength such as received signal strength indicator (RSSI), signal-to-noise ratio (SNR), or packet error rate of wireless signals. For example, when the rTWT requirement subfield 1133 is set to 1, in response to determining that a value indicating a load condition (e.g., BSS load on uplink (UL) or downlink (DL)) is greater than or equal to a load threshold, and/or a value indicating a channel condition (e.g., RSSI) is greater than or equal to a channel threshold, the non-TWT condition monitor 1272 or the association manger 1276 may determine to associate with, or maintain association (if already associated) with, a non-conforming STA which has neither binary value 01 nor binary value 10 in the restricted TWT support subfield 1064 of the capability information field 1053.

In some embodiments, if the AP 1250 sets the rTWT requirement subfield 1133 to the binary value 10 (indicating the AP's requirement for the RSTP support as the second capability), upon receiving, from a non-AP STA, a frame including the restricted TWT support subfield 1064 set to neither binary value 01 (indicating the second capability) nor binary value 10 (indicating the first capability), the AP (or the TWT capabilities tracker 1274) may determine to disassociate with, or not associate with, the non-AP STA as a non-conforming STA. On the other hand, upon receiving, from a non-AP STA, a frame including the restricted TWT support subfield 1064 set to the binary value 01 (indicating the second capability), the TWT capabilities tracker 1274 may determine to associate with (during an association process), or maintain association with (if already associated), the non-AP STA. In some embodiments, if the binary value 10 in the restricted TWT support subfield 1064 (indicating support of the first capability) also indicates support of the second capability, upon receiving, from a non-AP STA, a frame including the restricted TWT support subfield set to the binary value 01 or the binary value 10, the TWT capabilities tracker 1274 may determine to associate with, or maintain association with, the non-AP STA.

In some embodiments, if the AP 1250 sets the rTWT requirement subfield 1133 to the binary value 11 (indicating the AP's requirement for support of the rTWT operations as the first capability), upon receiving, from a non-AP STA, a frame including the restricted TWT support 1064 subfield not set to the binary value 10 (indicating the first capability), the AP may determine to disassociate with, or not associate with, the non-AP STA as a non-conforming STA. On the other hand, upon receiving, from a non-AP STA, a frame including the restricted TWT support subfield set to the binary value 10 (indicating the first capability), the AP (or the TWT capabilities tracker 1274) may determine to associate with (during an association process), or maintain association with (if already associated), the non-AP STA.

In some embodiments, a non-AP STA (e.g., the client device 1210 or the TWT capabilities/requirements tracker 1232) may keep/track/store TWT capabilities announcements and/or TWT requirements received from APs. The non-AP STA (e.g., the client device 1210) may determine to send an association request frame (e.g., association request 1291) to a particular AP (e.g., AP 1250) based on the TWT capabilities announcements (e.g., TWT capabilities announcement 1281) and/or TWT requirements (e.g., TWT requirements announcement 1283), received from the particular AP, and send, if determined, the association request frame 1291 to the particular AP 1250.

In some embodiments, the AP 1250 (or TWT capabilities tracker 1274) may keep/track/store TWT capabilities announcements received from STAs. Upon receiving an association request (e.g., association request 1291) from a particular STA (e.g., client device 1210), the TWT capabilities tracker 1274 may determine whether the AP associates with the particular STA, based on the TWT capabilities announcements received from the particular STA. The AP (or the association manager 1276) may then send, to the particular AP, an association response frame (e.g., the association response 1292) indicating whether the association request is accepted/approved. If the particular STA is already associated with the AP 1250, the TWT capabilities tracker 1274 may determine whether the AP maintains association with the particular STA, based on the TWT capabilities announcements received from the particular STA. If the TWT capabilities tracker 1274 determines that the AP no longer maintains association with the particular STA, the association manager 1276 may send a disassociation frame to the particular STA.

Figure 13:
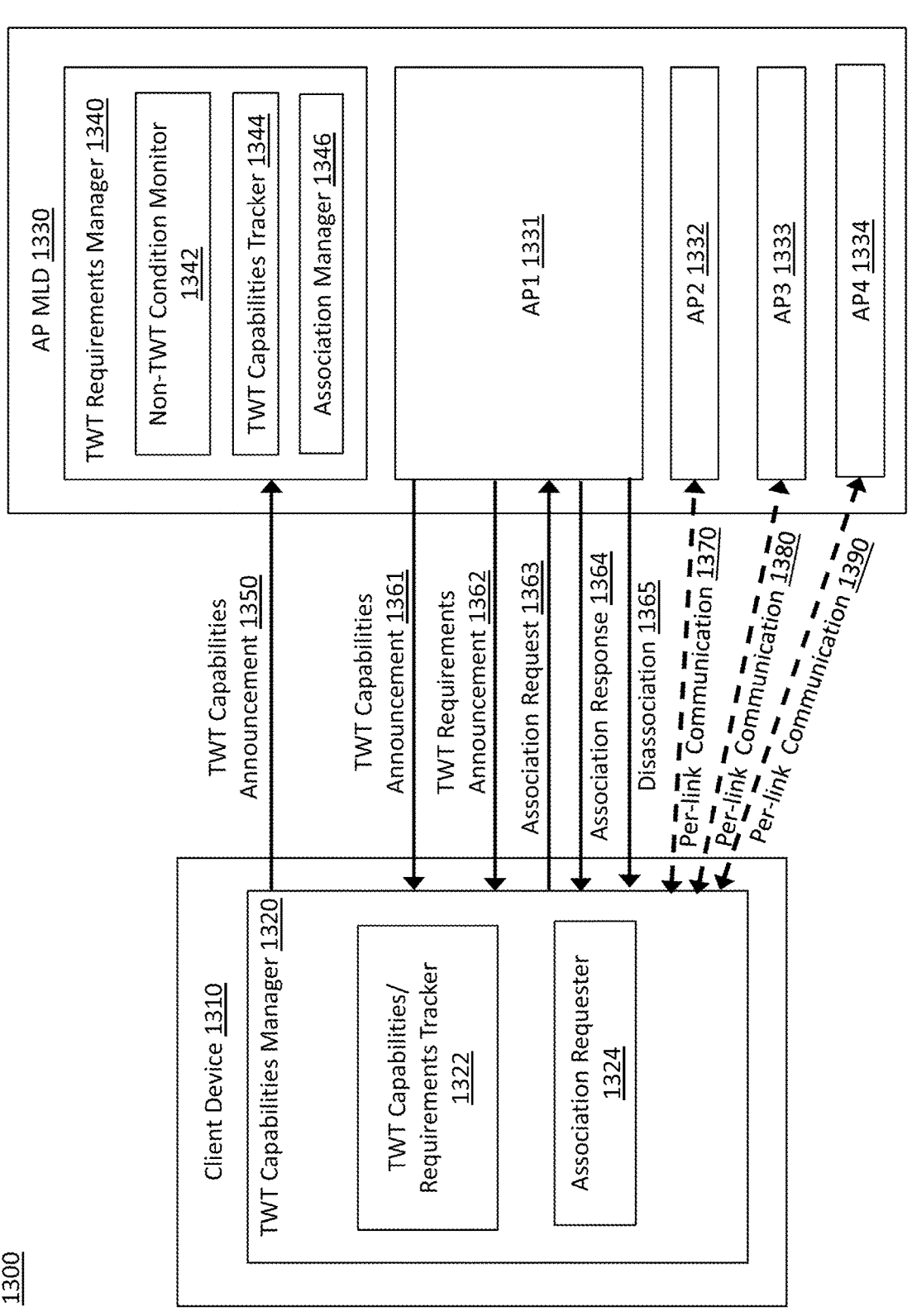
FIG. 13 is a block diagram of a system environment in which a client device and an AP multi-link device (MLD) communicate data relating to rTWT capabilities and requirements, according to an example implementation of the present disclosure.

FIG. 13 is a block diagram of a system environment 1300 in which a client device 1310 and an AP multi-link device (MLD) 1330 communicate data relating to rTWT capabilities and requirements, according to an example implementation of the present disclosure. In some embodiments, the client device 1310 may be a non-AP STA or a STA of non-AP MLD. The AP MLD 1330 may have a plurality of AP STAs (e.g., AP1 1331, AP2 1332, AP3 1333, AP4 1334). Here, an MLD is a device that can perform transmissions and receptions on more than one wireless interface link.

In some embodiments, the device 1310 may include a TWT capabilities manager 1320 having a configuration similar to the TWT capabilities manager 1230 of the device 1210. In some embodiments, the TWT capabilities manager 1320 may include a TWT capabilities/requirements tracker 1322 and/or an association requester 1324, which have a configuration similar to that of the TWT capabilities/requirements tracker 1232 and/or an association requester 1234 of the device 1210, respectively.

In some embodiments, the AP MLD 1330 may include a TWT requirements manager 1340 having a configuration similar to the TWT requirements manager 1270 of the AP 1250, except for TWT requirements manager 1340 manages TWT capabilities/requirements and associations per link basis with respect to each of the plurality of AP STAs (e.g., AP1 1331, AP2 1332, AP3 1333, AP4 1334). In some embodiments, the TWT requirements manager 1340 may include a non-TWT condition monitor 1342, a TWT capabilities tracker 1344, and/or an association manager 1346 which have a configuration similar to that of the non-TWT condition monitor 1272, the TWT capabilities tracker 1272, and/or the association manager 1274, respectively, except for the non-TWT condition monitor 1342, the TWT capabilities tracker 1344, and/or the association manager 1346 perform communications with the client device 1310 per link basis (e.g., per-link communication 1370, 1380, 1390) with respect to each of the plurality of AP STAs.

In some embodiments, each AP STA of the AP MLD (e.g., AP1 1331, AP2 1332, AP3 1333, AP4 1334) may receive announcements (e.g., TWT capabilities announcement 1350) that a STA has a capability to support rTWT operations (as the first capability), and/or (at least) a capability to operate according to channel access rules to protect rTWT SP start time (as the second capability). Each AP STA of the AP MLD can transmit information (e.g., TWT capabilities announcement 1361) to announce that the AP STA has a capability to support rTWT operations (as the first capability), and/or (at least) a capability to support RSTP (as the second capability). Each AP STA of the AP MLD can transmit information (e.g., TWT requirements announcement 1362) to announce different requirements for association with STA(s) in a wireless network using the rTWT requirement subfield 1133 of the EHT operation information field 1114.

In some embodiments, a non-AP STA (e.g., client device 1310 or association requester 1324) may perform communication relating to association/disassociation with an AP MLD per link basis (e.g., communicating with a selected link of the AP MLD; per-link communication 1370, 1380, 1390). The non-AP STA may perform communication relating to association/disassociation with an AP STA of the AP MLD in a manner similar to that of the STA perform communication relating to association/disassociation with a non-MLD AP (e.g., AP 1250). For example, the client device 1310 can send an association request 1363 to the AP STA of the AP MLD (e.g., AP1 1331), the AP1 1331 can send an association response 1363 to the client device 1310, and/or the AP1 1331 can send disassociation 1365 to the client device 1310, in a manner similar to that of communication between the STA and a non-MLD AP (e.g., AP 1250).

Figure 14:
FIG. 14 is a flowchart showing a process of protecting restricted target wake time operation for wireless communication, according to an example implementation of the present disclosure.

FIG. 14 is a flowchart showing a process 1400 of protecting restricted target wake time operation for wireless communication, according to an example implementation of the present disclosure. In some embodiments, the process 1400 is performed by a device (e.g., computing device 110, HWD 150, non-AP STA, client device 1210, 1310). In some embodiments, the process 1400 is performed by other entities. In some embodiments, the process 1400 includes more, fewer, or different steps than shown in FIG. 14.

In one approach, the device may determine 1402 a capabilities code (e.g., binary values 00, 01, 10 in restricted TWT support subfield 1064) indicating at least one of a plurality of defined capabilities of the device relating to rTWT operations in a WLAN. In some embodiments, the plurality of defined capabilities may include a capability to perform the rTWT operations (e.g., capability indicated by binary value 10 in restricted TWT support subfield 1064). The rTWT operations may include at least one of setting up a rTWT schedule or establishing a membership of a rTWT schedule.

In some embodiments, the plurality of defined capabilities may include a capability to complete or terminate a transmission by a start time of a rTWT service period (SP) assigned to another device (e.g., capability of RSTP support, indicated by binary values 01 in restricted TWT support subfield 1064). The one or more processors may be configured to obtain a transmit opportunity (TXOP) before the start time such that a duration of the TXOP ends before the start time.

In one approach, the device may wirelessly transmit 1404, via a transmitter, a first frame including the capabilities code (e.g., beacon frame, probe request frame, etc.). In some embodiments, the first frame may be a management frame including an information element (IE) (e.g., the EHT capabilities IE 1000, 1050). The capabilities code may be included in the IE of the management frame (e.g., restricted TWT support subfield 1064 of the EHT capabilities IE 1050).

FIG. 15 is a flowchart showing a process 1500 of protecting restricted target wake time operation for wireless communication, according to an example implementation of the present disclosure. In some embodiments, the process 1500 is performed by an access point (e.g., AP 105, soft AP, non-MLD AP 1250, MLD AP 1330). In some embodiments, the process 1500 is performed by other entities. In some embodiments, the process 1500 includes more, fewer, or different steps than shown in FIG. 15.

In one approach, the access point may determine 1502 a configuration indicating a preference or requirement relating to rTWT operations (e.g., binary values 01, 10, 11 in rTWT requirements subfield 1133) for a device (e.g., computing device 110, HWD 150, non-AP STA, client device 1210, 1310) to associate with the access point in a WLAN.

In one approach, the access point may receive 1504 a first frame (e.g., association request frame 1291, 1363) from the device, the first frame indicating a request for association with the access point and including a capabilities code indicating at least one of a plurality of defined capabilities of the device (e.g., binary values 00, 01, 10 in restricted TWT support subfield 1064).

In some embodiments, the capabilities code indicates at least one of (1) a capability that does not relate to the rTWT operations (e.g., binary value 00 in restricted TWT support subfield 1064), (2) a first rTWT capability to complete or terminate a transmission by a start time of a rTWT service period (SP) assigned to another device (e.g., binary value 01 in restricted TWT support subfield 1064), or (3) a second rTWT capability to perform the rTWT operations (e.g., binary value 10 in restricted TWT support subfield 1064). The configuration may indicate one of (1) a preference that the device supports the first rTWT capability (e.g., binary value 01 in rTWT requirements subfield 1133), (2) a requirement that the device supports the first rTWT capability (e.g., binary value 11 in rTWT requirements subfield 1133), or (3) a requirement that the device supports the second rTWT capability (e.g., binary value 10 in rTWT requirements subfield 1133).

In one approach, the access point (e.g., AP 1250 or TWT capabilities tracker 1274) may determine 1506 according to the configuration and the capabilities code, whether to accept the request (e.g., association request 1291). In some embodiments, the access point may determine whether the capabilities code indicates one or more capabilities relating to the rTWT operations. In response to the capabilities code not indicating one or more capabilities relating to the rTWT operations (e.g., binary value 00 in restricted TWT support subfield 1064), the access point may determine to reject the request.

In some embodiments, in response to (1) the configuration indicating the preference for the first rTWT capability (e.g., binary value 01 in rTWT requirements subfield 1133) and (2) the capabilities code neither indicating the first rTWT capability (e.g., binary value 10 in restricted TWT support subfield 1064) nor the second rTWT capability (e.g., binary value 01 in restricted TWT support subfield 1064), the access point (e.g., non-TWT condition monitor 1272) may determine, according to one or more conditions of the access point, whether the request is accepted, the one or more conditions including at least one of a traffic condition, a load condition, or a channel condition.

In some embodiments, in response to (1) the configuration indicating the requirement of the first capability (e.g., binary value 11 in rTWT requirements subfield 1133) and (2) the capabilities code indicating the first capability (e.g., binary value 10 in restricted TWT support subfield 1064), the one or more processors may determine to accept the request, and transmit, to the device, a response frame (e.g., association response 1292) in response to the first frame.

In some embodiments, in response to (1) the configuration indicating the requirement of the second capability (e.g., binary value 10 in rTWT requirements subfield 1133) and (2) the capabilities code indicating the second capability (e.g., binary value 01 in restricted TWT support subfield 1064), the one or more processors may determine to accept the request, and transmit, to the device, a response frame (e.g., association response 1292) in response to the first frame.

In some embodiments, the access point may determine whether the device is associated with the access point. In response to determining that the device is associated with the access point, the one or more processors may determine, according to the configuration and the capabilities code, whether the device is to be disassociated from the access point. For example, in response to determining that the device is to be disassociated from the access point, the association manager 1276 of the AP 1250 may send a disassociation 1295 to the client device 1210.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
one or more processors configured to:
determine a capabilities code among a plurality of capabilities codes each indicating a respective one of a plurality of defined capabilities of the device relating to restricted target wake time (rTWT) operations in a wireless local area network (WLAN), wherein the plurality of defined capabilities include (1) a capability that does not relate to the rTWT operations, (2) a capability to complete or terminate a transmission by a start time of a rTWT service period (SP) assigned to another device, and (3) a capability to perform the rTWT operations; and
wirelessly transmit, via a transmitter, a first frame including the capabilities code.

2. The device of claim 1, wherein:

the first frame is a management frame including an information element (IE), and the capabilities code is included in the IE of the management frame.

3. The device of claim 1, wherein the rTWT operations include at least one of setting up a rTWT schedule or establishing a membership of a rTWT schedule.

4. The device of claim 1, wherein the one or more processors are configured to:

obtain a transmit opportunity (TXOP) before the start time such that a duration of the TXOP ends before the start time.

\* \* \* \* \*